(12) United States Patent
Vierzba et al.

(10) Patent No.: US 12,216,000 B2
(45) Date of Patent: Feb. 4, 2025

(54) WALL MOUNTED DIGITAL SCALE

(71) Applicant: WallaWeigh LLC, East Bethel, MN (US)

(72) Inventors: Broc Vierzba, East Bethel, MN (US); Trisha Vierzba, East Bethel, MN (US)

(73) Assignee: WallaWeigh LLC, East Bethel, MN (US)

( * ) Notice: Subject to any disclaimer, the term of this patent is extended or adjusted under 35 U.S.C. 154(b) by 0 days.

(21) Appl. No.: 18/443,259

(22) Filed: Feb. 15, 2024

(65) Prior Publication Data

US 2024/0183706 A1    Jun. 6, 2024

Related U.S. Application Data

(63) Continuation-in-part of application No. 17/881,750, filed on Aug. 5, 2022, now abandoned.

(60) Provisional application No. 63/231,312, filed on Aug. 10, 2021.

(51) Int. Cl.
    *G01G 23/36*    (2006.01)
    *G01G 21/28*    (2006.01)

(52) U.S. Cl.
    CPC ............. *G01G 23/36* (2013.01); *G01G 21/28* (2013.01)

(58) Field of Classification Search
    CPC ......... G01G 19/14; G01G 21/28; G01G 23/36
    See application file for complete search history.

(56) References Cited

U.S. PATENT DOCUMENTS

| | | | | |
|---|---|---|---|---|
| 2,924,443 | A * | 2/1960 | Townsend | G01G 19/44 |
| | | | | 177/126 |
| 3,027,215 | A * | 3/1962 | Duncan | E06B 3/385 |
| | | | | 16/221 |
| 3,097,712 | A * | 7/1963 | Johnson | G01G 19/44 |
| | | | | 177/144 |
| 4,288,131 | A * | 9/1981 | Griffin | G01G 19/44 |
| | | | | 5/147 |
| 5,986,222 | A * | 11/1999 | Helberg | G01G 19/14 |
| | | | | 177/148 |
| 10,641,647 | B2 * | 5/2020 | Wood | G01G 21/23 |
| 2002/0195282 | A1 * | 12/2002 | Thadani | G01G 19/14 |
| | | | | 177/148 |
| 2006/0065448 | A1 * | 3/2006 | Hudson | G01G 19/14 |
| | | | | 177/148 |
| 2007/0068270 | A1 * | 3/2007 | Coffey | G01G 19/14 |
| | | | | 73/760 |
| 2013/0014437 | A1 * | 1/2013 | Schutter | A01G 27/003 |
| | | | | 177/60 |
| 2023/0050341 | A1 * | 2/2023 | Vierzba | G01G 21/283 |

(Continued)

FOREIGN PATENT DOCUMENTS

| | | | | |
|---|---|---|---|---|
| CN | 108267208 | A * | 7/2018 | |
| DE | 29923748 | U1 * | 3/2001 | G01G 21/22 |
| DE | 20320737 | U1 * | 3/2005 | G01G 1/24 |

(Continued)

*Primary Examiner* — Natalie Huls
(74) *Attorney, Agent, or Firm* — Gallium Law; Jacob Panangat; Isabel Fox

(57) ABSTRACT

The disclosure includes a scale comprising a housing, an arm hingedly coupled to the housing, and a display located on the housing. In some embodiments, the arm is configured to receive at least a portion of an item to be weighed, and the display is configured to show the weight of the item. The scale may be configured to couple to a wall of a building.

20 Claims, 24 Drawing Sheets

(56) References Cited

U.S. PATENT DOCUMENTS

2024/0019294 A1\* 1/2024 Cao ..................... G01G 23/005

FOREIGN PATENT DOCUMENTS

| DE | 10360266 A1 | \* | 7/2005 | ............. G01G 21/22 |
| GB | 2443844 A | \* | 5/2008 | ............. G01G 19/14 |
| GB | 2477349 A | \* | 8/2011 | ............. G01G 19/14 |

\* cited by examiner

WALL MOUNTED DIGITAL SCALE

A scale is a device used to quantify the weight of an item. Scales are widely used across different industries and can range from large-capacity devices used in manufacturing and shipping to small-capacity devices used in home cooking and baking. Another common use for scales is to weigh luggage.

Luggage is essential while traveling. However, luggage is typically subject to strict weight limits, especially for air travel. If luggage weighs more than the permitted weight, a traveling individual may incur a significant fee and/or have to remove items from the luggage to meet the weight requirement. This is undesirable and may be embarrassing for individuals. As a result, individuals may want to weigh their bags before leaving for the airport. Traditionally, travelers have had to make do with using a bathroom scale or a hand-held luggage scale, but both of these options have drawbacks.

For example, traveling individuals may not always have access to a bathroom scale before going to the airport, especially in a hotel or other similar accommodation. Hand-held luggage scales must be packed in the luggage and brought on a trip to be used for the return journey. In addition, both bathroom scales and hand-held luggage scales may not be accurate.

Therefore, there exists a long-felt need in the art for a device that allows individuals to conveniently weigh their bags to prevent them from arriving at an airport with overweight luggage.

SUMMARY

The subject matter disclosed and claimed herein, in one embodiment thereof, comprises a luggage scale device. The device is primarily comprised of a housing with at least one weighing member, at least one display, and at least one strain gauge load cell. In the preferred embodiment, the housing has a front wall, a plurality of side walls, and a rear wall that form a generally rectangular housing. The front wall of the housing is comprised of a weighing member that extends outwards from the front wall via at least one hinge such that the weighing member is perpendicular to the front wall.

The rear surface of the weighing member is further comprised of at least one strain gauge load cell. The cell is comprised of at least one strain gauge, at least one load cell sensor (i.e., force transducer), at least one converter, and at least one microchip.

To use the device, a user first secures the rear wall of the housing to a wall via at least one fastener that allows the rear surface to fasten to the wall. The user can then position the weighing member perpendicular to the front wall. Then, the strap or straps of a piece of luggage, bag, or other item can be placed on the weighing member such that the strap contacts the strain gauge load cell and is suspended off the ground via the weighing member.

The load cell sensor has an electric charge such that as the sensor is pressed downward and once the strap is placed on the sensor, the electrical resistance of the sensor will change. The strain gauge then converts this change into an electric signal that runs through at least one analog to digital converter which is in electrical communication with at least one microchip. The microchip is in electrical communication with at least one display such that the weight of the luggage is displayed in numerical form via at least one indicia. The load cell and display are powered by and in electrical communication with at least one battery. The battery may be recharged by at least one USB port of any USB type known in the art.

Accordingly, the luggage scale device of the present invention is particularly advantageous as it provides a device that prevents a user from arriving at an airport with overweight luggage by allowing a user to conveniently weigh their luggage. In addition, the device is easily transportable and can be used anywhere, which is extremely advantageous for travelers. In this manner, the luggage scale device provides a novel solution to on-the-go luggage weighing.

The disclosure includes a scale comprising a housing, an arm hingedly coupled to the housing, the arm configured to receive at least a portion of an item to be weighed, and a display located on the housing, the display configured to show a weight of the item. In some embodiments, the housing comprises a rear wall, and the arm comprises a first end and a second end located opposite the first end. The second end may be hingedly coupled to the rear wall. In some embodiments, the scale further comprises a weighing portion located on the arm. The weighing portion may be located closer to the first end than the second end, and may be configured to receive the at least a portion of the item to be weighed.

In some embodiments, the scale further comprises a button located on a front surface of the rear wall. The button may be configured to tare the weighing portion of the scale. In some embodiments, the button is configured to zero the weighing portion of the scale. The scale may also include a toggle switch located on a front surface of the rear wall. In some embodiments, the toggle switch is configured to select a unit of measure for the weight. The unit of measure may comprise one of kilograms and pounds. In some embodiments, the scale is powered by at least one battery. The scale may further comprise a battery compartment located on the rear wall.

In some embodiments, the housing comprises a top portion. The display may be located on the top portion. The housing may also comprise a bottom portion located opposite the top portion. In some embodiments, the arm is hingedly coupled to the housing closer to the bottom portion than the top portion. The scale may further comprise a plate removably coupled to a back surface of the rear wall of the housing. In some embodiments, the plate is configured to couple, via an attaching mechanism, to a wall of a building to thereby couple the scale to the wall of the building.

The disclosure includes a scale comprising a housing, an arm coupled to the housing, a weighing portion located on the arm, the weighing portion configured to receive at least a portion of an item to be weighed, and a display located on the housing, the display configured to show a weight of the item. In some embodiments, the display is configured to show the weight of the item in units selected from the group consisting of pounds, kilograms, grams, ounces, and combinations thereof.

The weighing portion may be configured to receive a secondary device configured to hold the item to be weighed. In some embodiments, the secondary device is selected from the group consisting of a bag, a basket, a tray, a hook, and combinations thereof.

The scale may further comprise a strain gauge, a load cell sensor, a converter, and a microchip. In some embodiments, the load cell sensor has an electric charge, and the strain gauge is configured to convert a change in the electric charge to an analog electric signal. The converter may be configured to convert the analog electric signal to a digital signal. In some embodiments, the microchip receives the digital signal and communicates the digital signal to the display. The display may be configured to show the digital signal as the weight.

The foregoing, and other features and advantages of the invention, will be apparent from the following, more particular description of the preferred embodiments of the invention, the accompanying drawings, and the claims.

BRIEF DESCRIPTION OF THE DRAWINGS

These and other features, aspects, and advantages are described below with reference to the drawings, which are intended to illustrate, but not to limit, the invention. In the drawings, like characters denote corresponding features consistently throughout similar embodiments.

COMPONENT INDEX

Figure 1:
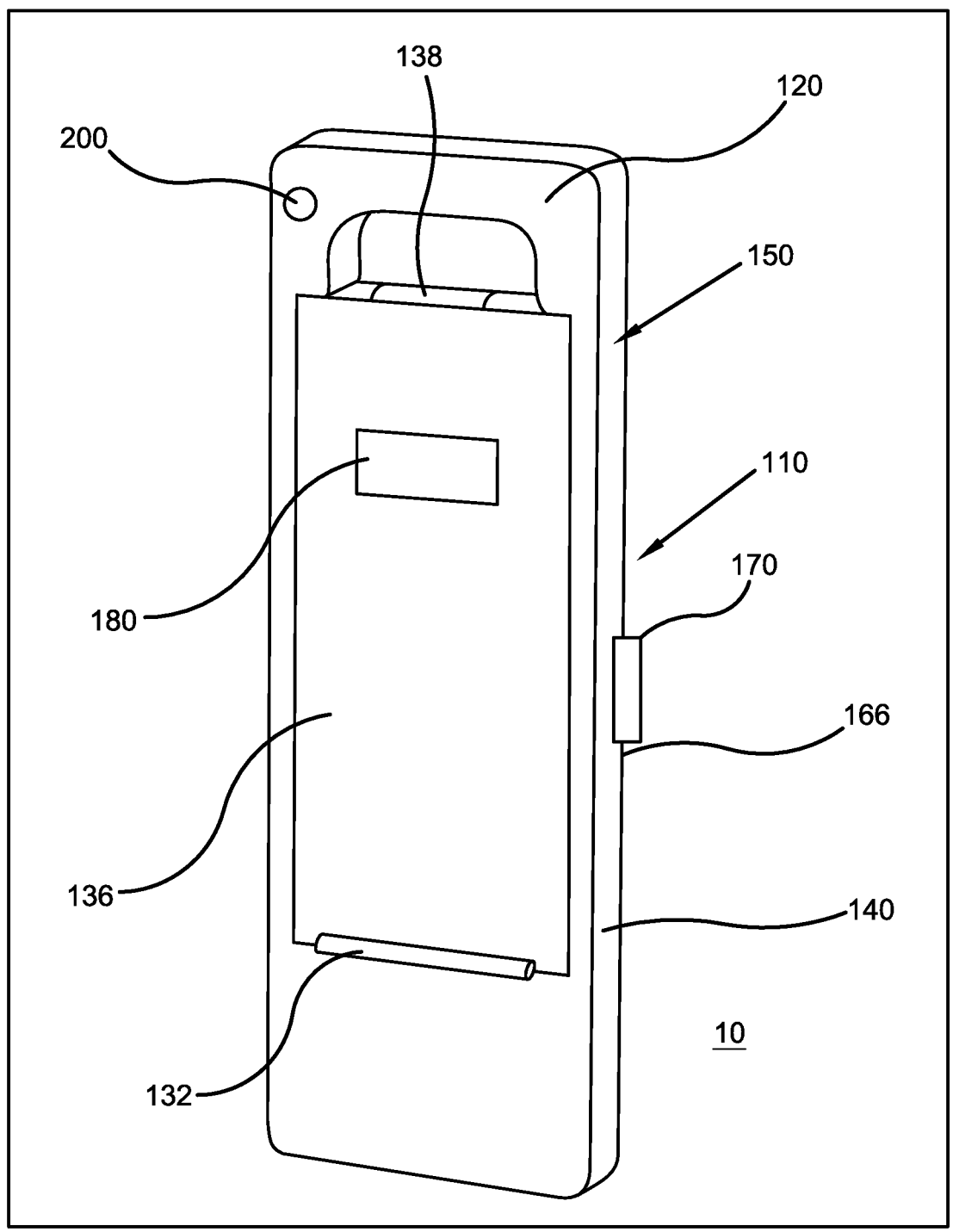
FIG. 1 illustrates a perspective view of a luggage scale device of the present invention while attached to a wall and in a closed position, according to some embodiments.

10—wall
20—luggage
30—straps
100—device
110—housing
120—front wall
130—weighing member
132—hinge
134—rear surface
136—front surface
138—fastener
140—side walls
150—rear wall
160—front surface
162—display
164—indicia
166—rear surface
170—fastener
180—handle
190—battery
192—USB port
200—button
300—strain gauge load cell
310—strain gauge
320—load cell sensor
330—converter
340—microchip
400—scale
402—housing
404—arm
404a—upper arm structure
404b—middle arm structure
404c—lower arm structure
406—display
408—luggage
500—top portion (of housing)
502—bottom portion (of housing)
600—rear wall
602—first end (of arm)
604—second end (of arm)
606—weighing portion
608—battery compartment cover
700—front surface (of rear wall)
702—button
704—toggle switch
706—battery compartment
800—plate
802—attaching mechanism
804—attaching mechanism
1100—hinge
1200—load cell sensor
1300—basket
1302—basket handles
1400—rope
1402—hook
1500—tray
1600—tray
1602—tray handles
1700—bag
1702—bag handles
2200—scale
2202—housing
2204—rear wall
2206—front surface
2208—arm
2210—first button
2212—second button
2214—display
2216—battery compartment
2218—battery compartment cover

DETAILED DESCRIPTION

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long-felt need in the art for a device that prevents a user from arriving at an airport with overweight luggage. There also exists a long-felt need in the art for a luggage scale device that can be used to weigh luggage.

The present invention, in one exemplary embodiment, is comprised of a luggage scale device. The device is primarily comprised of a housing with at least one weighing member, at least one display, and at least one strain gauge load cell. In the preferred embodiment, the housing has a front wall, a plurality of side walls, and a rear wall that form a generally rectangular housing. The front wall is comprised of a weighing member that extends outward from the front wall via at least one hinge such that the weighing member is perpendicular to the front wall. The rear surface of the weighing member is further comprised of at least one strain gauge load cell. The cell is comprised of at least one strain gauge, at least one load cell sensor (i.e., force transducer), at least one converter, and at least one microchip.

To use the device, a user first secures the rear wall of the housing to a wall via at least one fastener that allows the rear surface to fasten to the wall. The user can then position the weighing member perpendicular to the front wall. Then, the strap or straps of a piece of luggage, bag, or other item can be placed on the weighing member such that the strap contacts the strain gauge load cell and is suspended off the ground via the weighing member.

The load cell sensor has an electric charge such that as the sensor is pressed downward and once the strap is placed on the sensor, the electrical resistance of the sensor will change. The strain gauge then converts this change into an electric signal that runs through at least one analog to digital converter which is in electrical communication with at least one microchip. The microchip is in electrical communication with at least one display such that the weight of the luggage is displayed in numerical form via at least one indicia. The load cell and display are powered by and in electrical communication with at least one battery. The battery may be recharged by at least one USB port of any USB type known in the art.

Accordingly, the luggage scale device of the present invention is particularly advantageous as it provides a device that prevents a user from arriving at an airport with overweight luggage by allowing a user to conveniently weigh their luggage. In addition, the device is easily transportable and can be used anywhere, which is extremely advantageous for travelers. In this manner, the luggage scale device provides a novel solution to on-the-go luggage weighing.

Referring initially to the drawings, FIG. 1 illustrates a perspective view of one potential embodiment of a luggage scale device 100 of the present invention while attached to a wall and in a closed position in accordance with the disclosed architecture. The device 100 is primarily comprised of a housing 110 with at least one weighing member 130, at least one display 162, and at least one strain gauge load cell 300. The device 100 and all components are preferably made from a rigid plastic such as, but not limited to, acrylic, polycarbonate, polyethylene, thermoplastic, acrylonitrile butadiene styrene, low-density polyethylene, medium-density polyethylene, high-density polyethylene, polyethylene terephthalate, polyvinyl chloride, polystyrene, polylactic acid, acetal, nylon, fiberglass, recycled plastic, biodegradable plastic, etc., and/or a durable metal such as, but not limited to, aluminum or stainless steel. In the preferred embodiment, the housing 110 has a front wall 120, a plurality of side walls 140, and a rear wall 150 that form a generally rectangular housing 110. However, the housing 110 may be any shape known in the art such as, but not limited to, square, circular, polygonal, etc.

Figure 2:
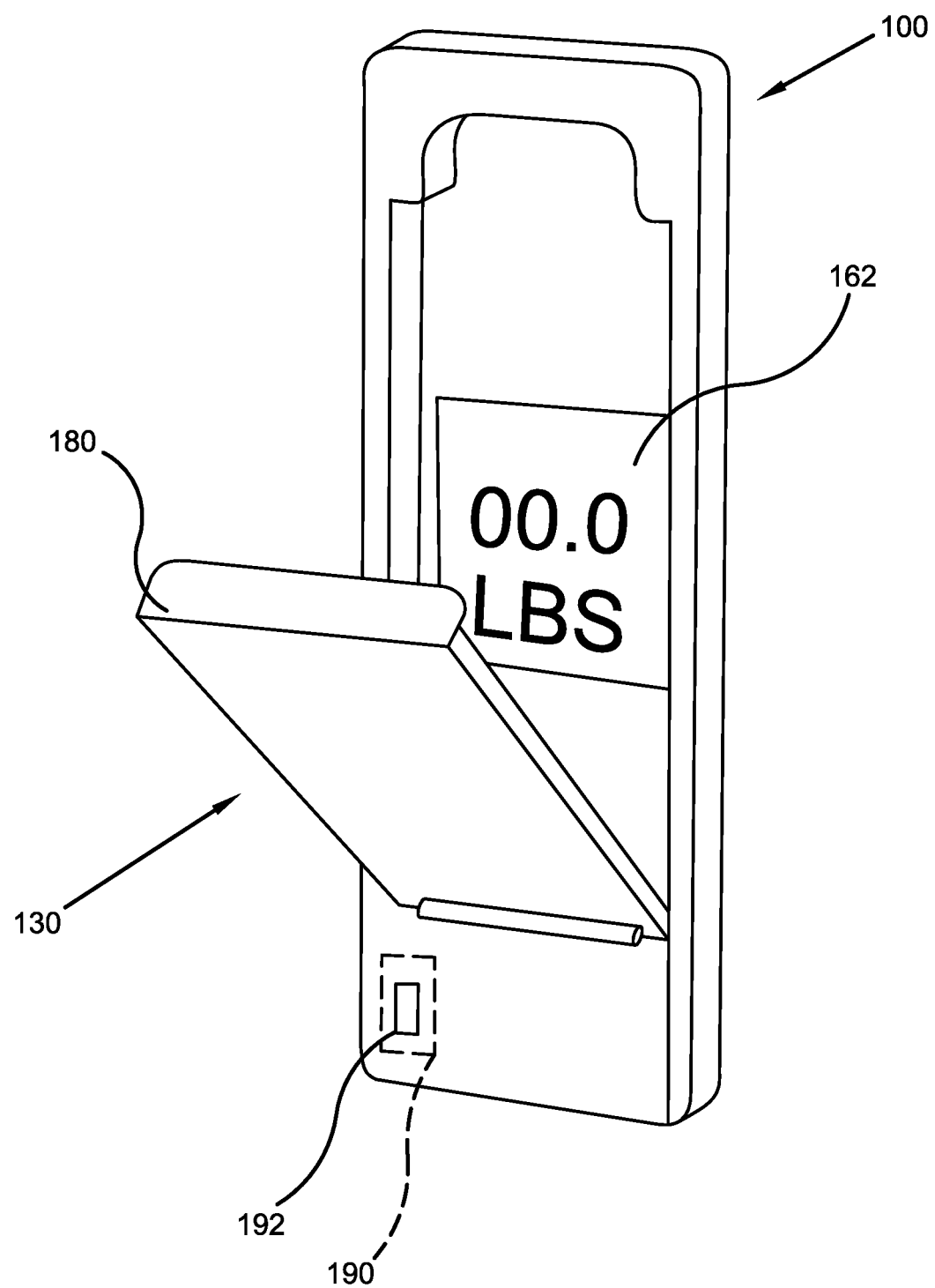
FIG. 2 illustrates a perspective view of a luggage scale device of the present invention while attached to a wall and in an opened position, according to some embodiments.

The front wall 120 of the housing 110 is comprised of a weighing member 130. The weighing member 130 extends outward from the front wall 120 via at least one hinge 132 (as seen in FIG. 2) such that the weighing member 130 is perpendicular to the front wall 120. In various embodiments, the hinge 132 may be any hinge type known in the art such as, but not limited to, an offset blind hinge, a knuckle hinge, a butt hinge, a rising butt hinge, a gravity pivot hinge, a ball bearing hinge, a barrel hinge, a concealed hinge, a knife hinge, a piano hinge, a strap hinge, a pivot hinge, a gas-piston hinge, an injection molded hinge, a locking hinge, etc.

In one embodiment, the rear surface 134 and/or front surface 136 of the weighing member 130 may have at least one fastener 138. The fastener 138 allows the weighing member 130 to remain secure (i.e., locked) to the front wall 120 and/or the front surface 160 of the rear wall 150 when the device 100 is not in use. There may also be a reciprocating fastener 138 of the same type located on the front wall 120 and/or the front surface 160 of the rear wall 150. The fastener 138 may be any fastener type known in the art such as, but not limited to, hook and loop, adhesive, magnetic, snap-button, tongue and groove, latch, etc.

The weighing member 130 is preferably rectangular in shape but may be any shape known in the art such as, but not limited to, a hook-like shape in various embodiments. The rear surface 134 of the weighing member 130 is further comprised of at least one strain gauge load cell 300. The cell 300 is comprised of at least one strain gauge 310, at least one load cell sensor 320 (i.e., force transducer), at least one converter 330, and at least one microchip 340.

Figure 3:
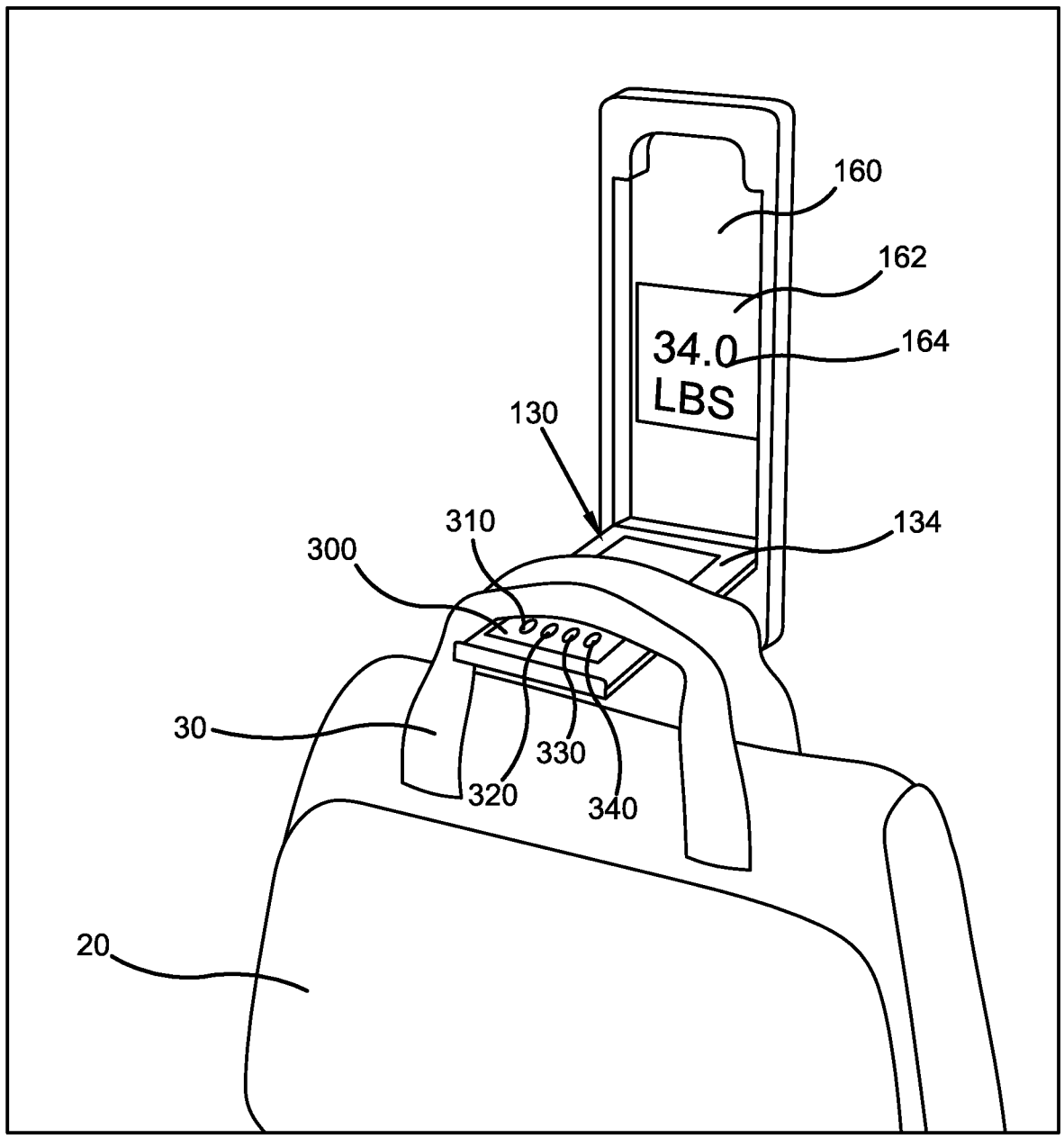
FIG. 3 illustrates a perspective view of a luggage scale device of the present invention while attached to a wall and in an opened position while weighing luggage, according to some embodiments.

FIG. 3 illustrates a perspective view of one potential embodiment of a luggage scale device 100 of the present invention while attached to a wall and in an opened position while weighing luggage in accordance with the disclosed architecture. To use the device 100, a user first secures the rear wall 150 of the housing 110 to a wall 10. The rear surface 166 of the rear wall 150 has at least one fastener 138 that allows rear surface 166 to fasten to the wall 10. The fastener 138 may be any fastener known in the art such as, but not limited to, adhesive, magnetic, suction cup, etc. The user can then position the weighing member 130 perpendicular to the front wall 120. The weighing member 130 may further be comprised of at least one handle 180 to aid in the repositioning of the weighing member 130 during use. Then, the strap 30 or straps 30 of a piece of luggage 20, bag, or other item can be placed on the weighing member 130 such that the strap 30 contacts the strain gauge load cell 300 and is suspended off the ground via the weighing member 130. The device 100 may be used to weigh luggage 20 but may also be used to weigh various items that can be placed within a bag or other hanging object. At least one button 200 on the housing 110 may allow a user to tare the strain gauge 310 to account for the extra weight of a bag which various items may be placed in.

The load cell sensor 320 has an electric charge. As the sensor 320 is pressed downward and once the strap 30 is placed on the sensor 320, the electrical resistance of the sensor 320 will change. The strain gauge 310 then converts this change into an electric signal. The electric signal runs through at least one analog to digital converter 330 which is in electrical communication with at least one microchip 340. The microchip 340 is in electrical communication with at least one display 162 such that the weight of the luggage 20 is displayed in numerical form via at least one indicia 164. The display 162 may be positioned anywhere on the housing 110 but is preferably positioned on the front surface 160 of the rear wall 150. In various embodiments, the display 162 may display the weight of the luggage 20 in a plurality of weight units such as, but not limited to, pounds, ounces, grams, kilograms, etc., that can be selected via the button 200. It is preferred that the device 100 have a minimum weight of 1 gram (or equivalent other unit). The display 162 may be any display screen known in the art such as, but not limited to, a touch screen, an LCD screen, an OLED screen, an ELD screen, an LED backlit LCD screen, an LED screen, a PDP screen, etc.

The load cell 300 and display 162 are powered by and in electrical communication with at least one battery 190. The battery 190 may be a disposable battery 190 or a rechargeable battery 190 in the form of an alkaline, nickel-cadmium, nickel-metal hydride battery 190, etc., such as any 3V-12 volts DC battery 190 or other conventional battery 190 such as A, AA, AAA, etc., that supplies power to the device 100. Throughout this specification the terms "battery" and "batteries" may be used interchangeably to refer to one or more wet or dry cells or batteries 190 of cells in which chemical energy is converted into electricity and used as a source of DC power. References to recharging or replacing batteries 190 may refer to recharging or replacing individual cells, individual batteries 190 of cells, or a package of multiple battery cells as is appropriate for any given battery 190 technology that may be used. Additionally, the battery 190 may be recharged by at least one USB port 192 of any USB type known in the art.

Figure 4:
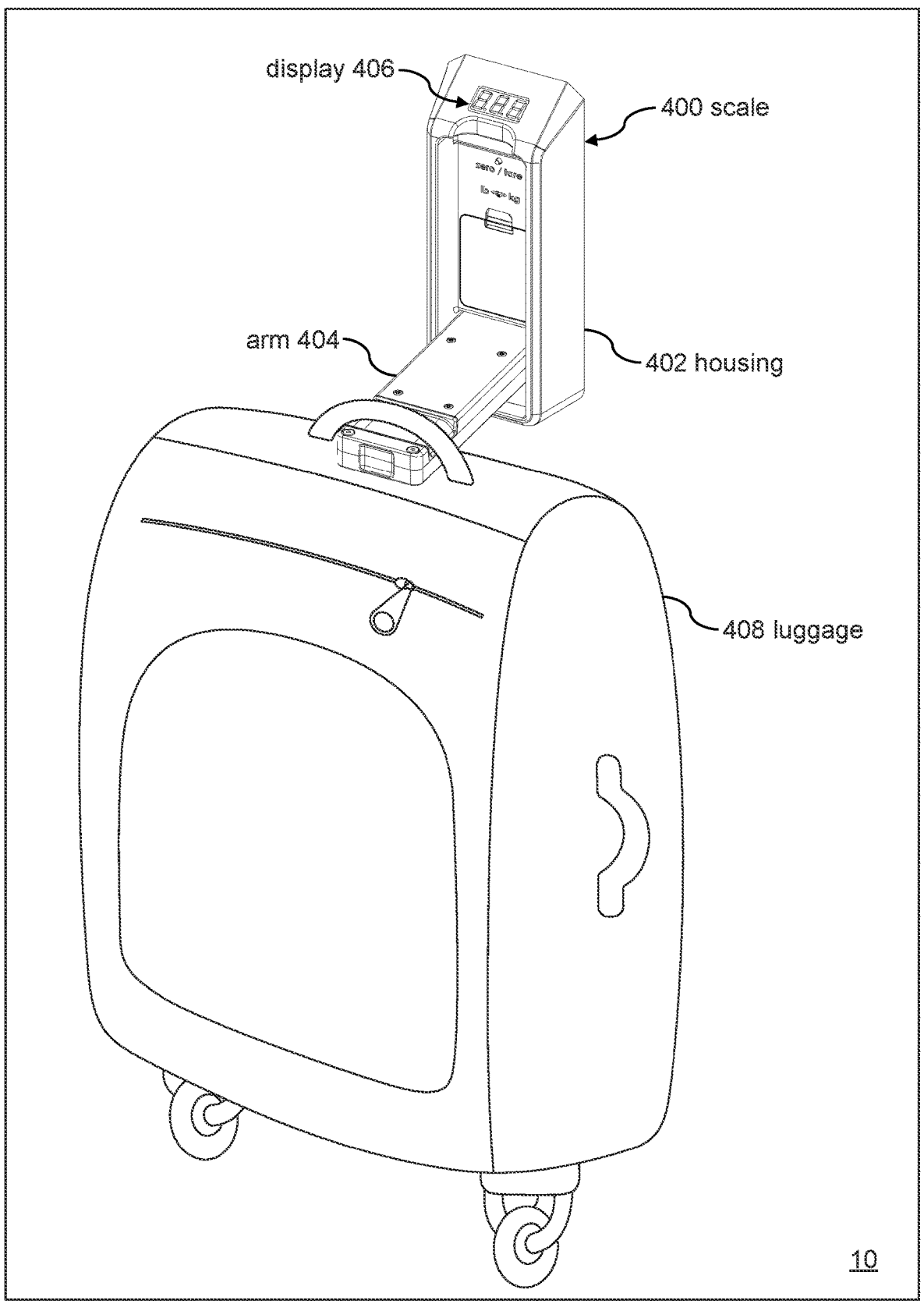
FIG. 4 illustrates a perspective view of a scale holding a piece of luggage, according to some embodiments.

Referring now to FIG. 4, a perspective view of a scale 400 is shown. Any device and scale embodiments (100, 400, and 2200) disclosed herein may incorporate any of the features and components described with respect to each other. For example, scale 400 may include any of the features described with respect to device 100 and scale 2200, and vice versa.

Figure 5:
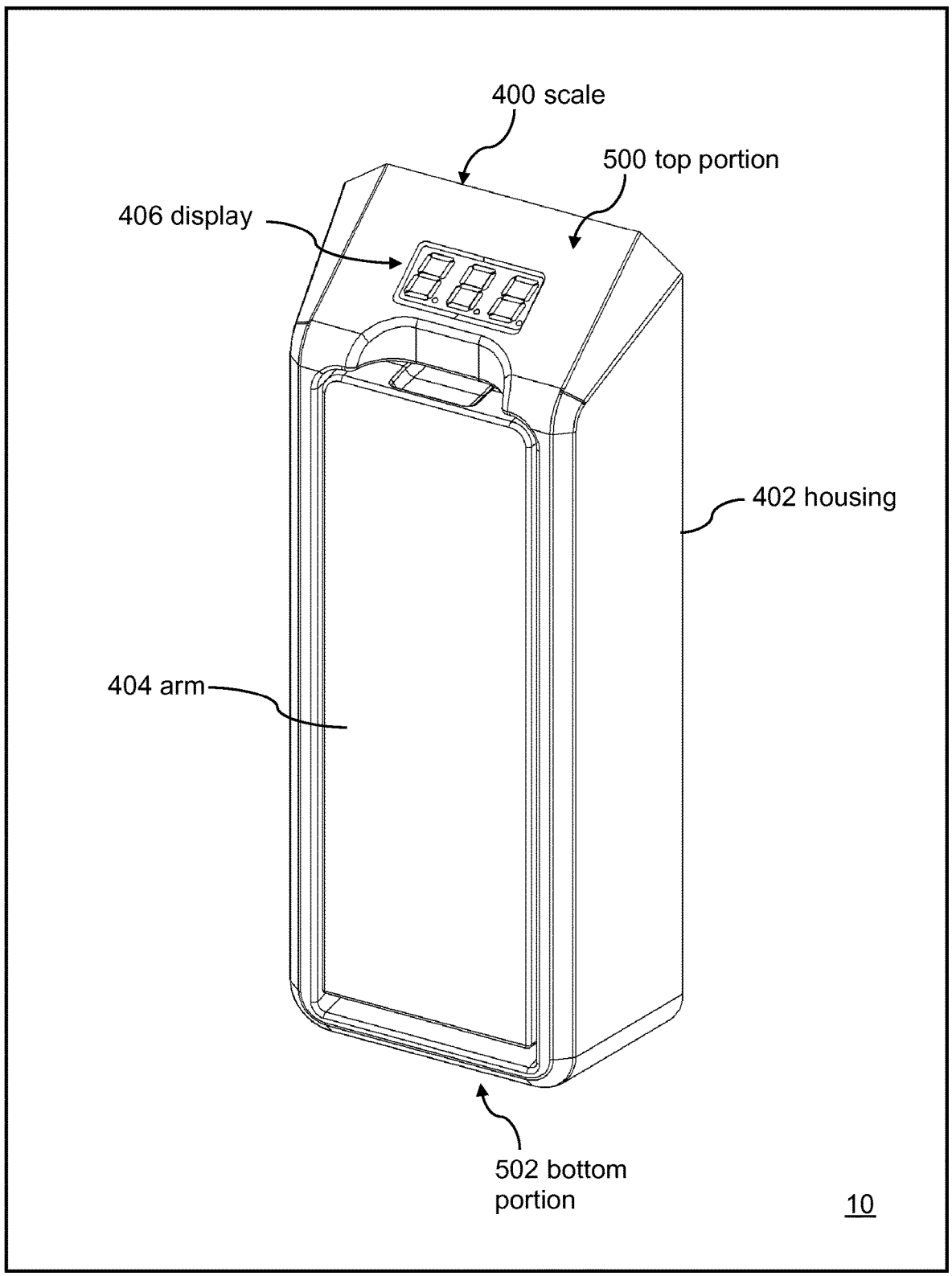
FIG. 5 illustrates a perspective view of the scale in a closed position, according to some embodiments.

In some embodiments, the scale 400 includes a housing 402, an arm 404, and a display 406. As demonstrated in FIG. 4, the arm 404 may be configured to receive at least a portion of an item to be weighed, such as a handle of a piece of luggage 408. The display 406 may be configured to show the weight of the item. In some embodiments, the arm 404 is hingedly coupled to the housing 402 and is configured to fold up into the housing 402 when not in use, as illustrated in FIG. 5. In addition, FIG. 4 shows the scale 400 mounted to a wall 10, similar to the device 100 shown in FIGS. 1 and 3.

FIG. 5 shows a perspective view of the scale 400 mounted on the wall 10 and in a closed position, with the arm 404 folded substantially flush with the housing 402. In some embodiments, at least one of the arm 404 and the housing 402 comprises a fastening mechanism to keep the arm 404 engaged with the housing 402 in the closed position. For example, the arm 404 and/or the housing 402 may include a clip or similar fastener that engages when the arm 404 is folded into the housing 402. The arm 404 and the housing 402 may also fit together via a friction fit. It should be noted that the arm 404 may be configured to be "put away" in a manner other than folding against the housing 402. For example, the arm 404 may comprise a telescoping arm, such that the arm 404 can collapse into itself when not in use. Alternatively, the arm 404 may be configured to fold onto itself, such as in half or thirds, before folding against the housing 402. These examples are included as non-limiting possibilities, and it is understood that a person having ordinary skill in the art may conceive of numerous ways to store and secure the arm 404.

In some embodiments, the housing 402 comprises a top portion 500 and a bottom portion 502. As previously mentioned, the arm 404 may be hingedly coupled to the housing 402. In some embodiments, the arm 404 is hingedly coupled to the housing 402 closer to the bottom portion 502 than the top portion 500. The arm 404 may be hingedly coupled to the housing 402 adjacent the bottom portion 502. In some embodiments, in the closed position, the arm 404 folds into the housing 402 and is secured adjacent the top portion 500. The arm 404 may be secured to the housing 402 closer to the top portion 500 than the bottom portion 502. As shown in FIG. 5, the display 406 may be located on the top portion 500. It should be noted that the display 406 may be located anywhere on the housing 402, including, but not limited to, the top portion 500, the bottom portion 502, and a side wall anywhere along the perimeter of the housing 402.

Figure 6:
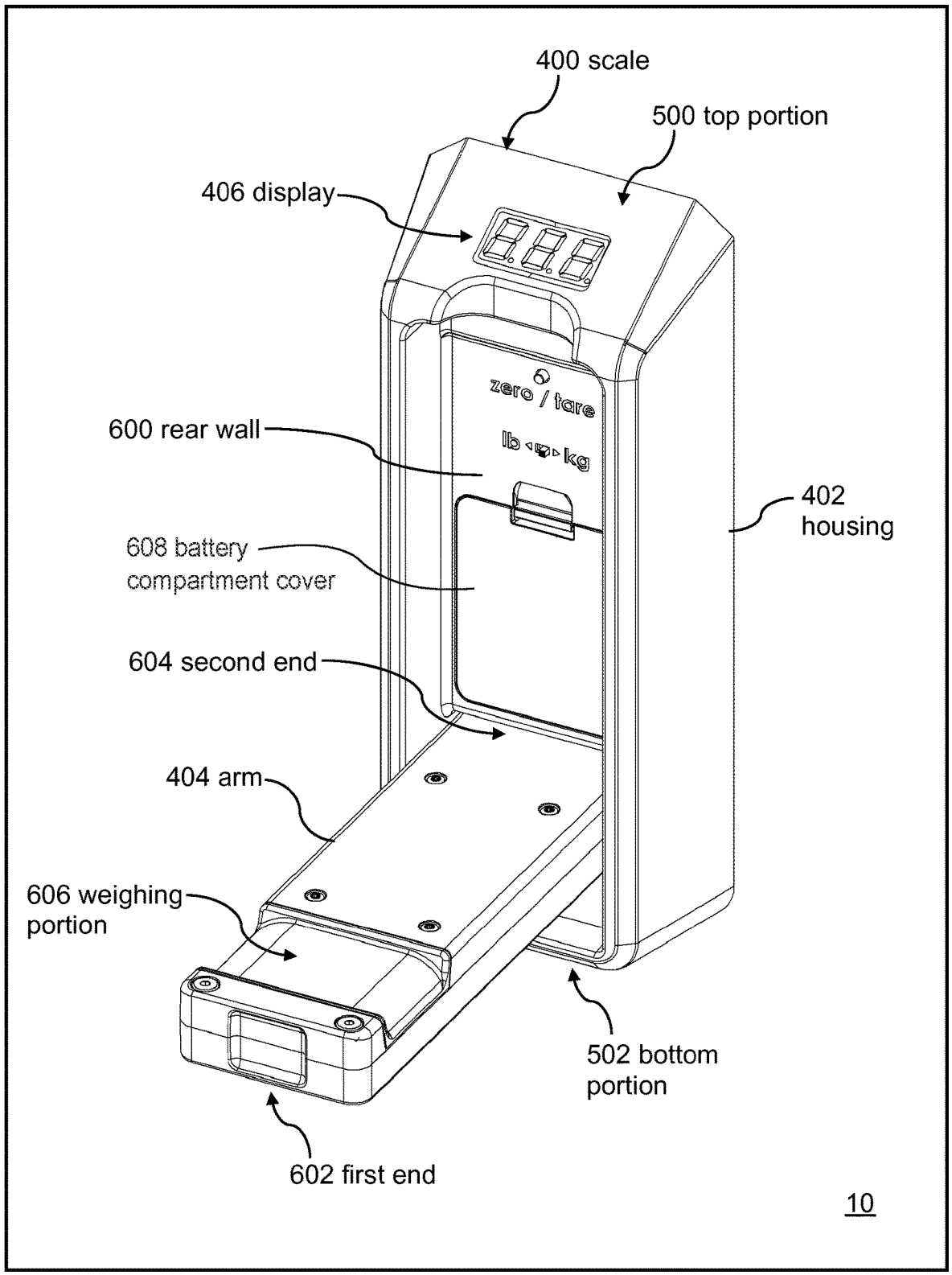
FIG. 6 illustrates a perspective view of the scale in an open position, according to some embodiments.

FIG. 6 shows a perspective view of the scale 400 in an open position, again mounted to the wall 10. With the scale 400 in an open position with the arm 404 folded down, rather than folded up, as shown in FIG. 5, a rear wall 600 is visible. In some embodiments, the housing 402 comprises a rear wall 600 extending between the top portion 500 and the bottom portion 502. When the arm 404 folds into the housing 402 in the closed position, at least a portion of the arm 404 may be configured to contact the rear wall 600.

In some embodiments, the arm 404 comprises a first end 602 and a second end 604 located opposite the first end 602. The second end 604 may be hingedly coupled to the housing 402, and the first end 602 may extend outward from the housing 402. In some embodiments, the second end 604 is coupled to the rear wall 600. The second end 604 may be coupled to the rear wall 600 closer to the bottom portion 502 of the housing 402 than the top portion 500. In some embodiments, when the arm 404 folds up into the closed position, the first end 602 couples to the housing 402 closer to the top portion 500 than the bottom portion 502.

The scale 400 may include a weighing portion 606 located on the arm 404, as illustrated in FIG. 6. In some embodiments, the weighing portion 606 is configured to receive at least a portion of the item to be weighed, such as the handle of a suitcase. The weighing portion 606 may be located closer to the first end 602 of the arm 404 than the second end 604. The weighing portion 606 may be located closer to the second end 604 than the first end 602. The weighing portion 606 may be located substantially in the middle of the arm 404 equidistant from the first end 602 and the second end 604. In some embodiments, the weighing portion 606 comprises a different proportion than shown in FIG. 6. For example, the weighing portion 606 may cover about half of the arm 404. In some embodiments, the weighing portion 606 covers less of the arm 404 than shown in FIG. 6. The weighing portion 606 may cover substantially all of the arm 404, such that an item may be placed anywhere on the arm 404 to be weighed. In some embodiments, the weighing portion 606 defines a recessed portion of the arm 404. The weighing portion 606 may be thought of as similar to a cradle designed to hold a handle of an item to be weighed. The arm 404 and the weighing portion 606 will be discussed further with reference to FIG. 12. FIG. 6 also shows a battery compartment cover 608.

Figure 7:
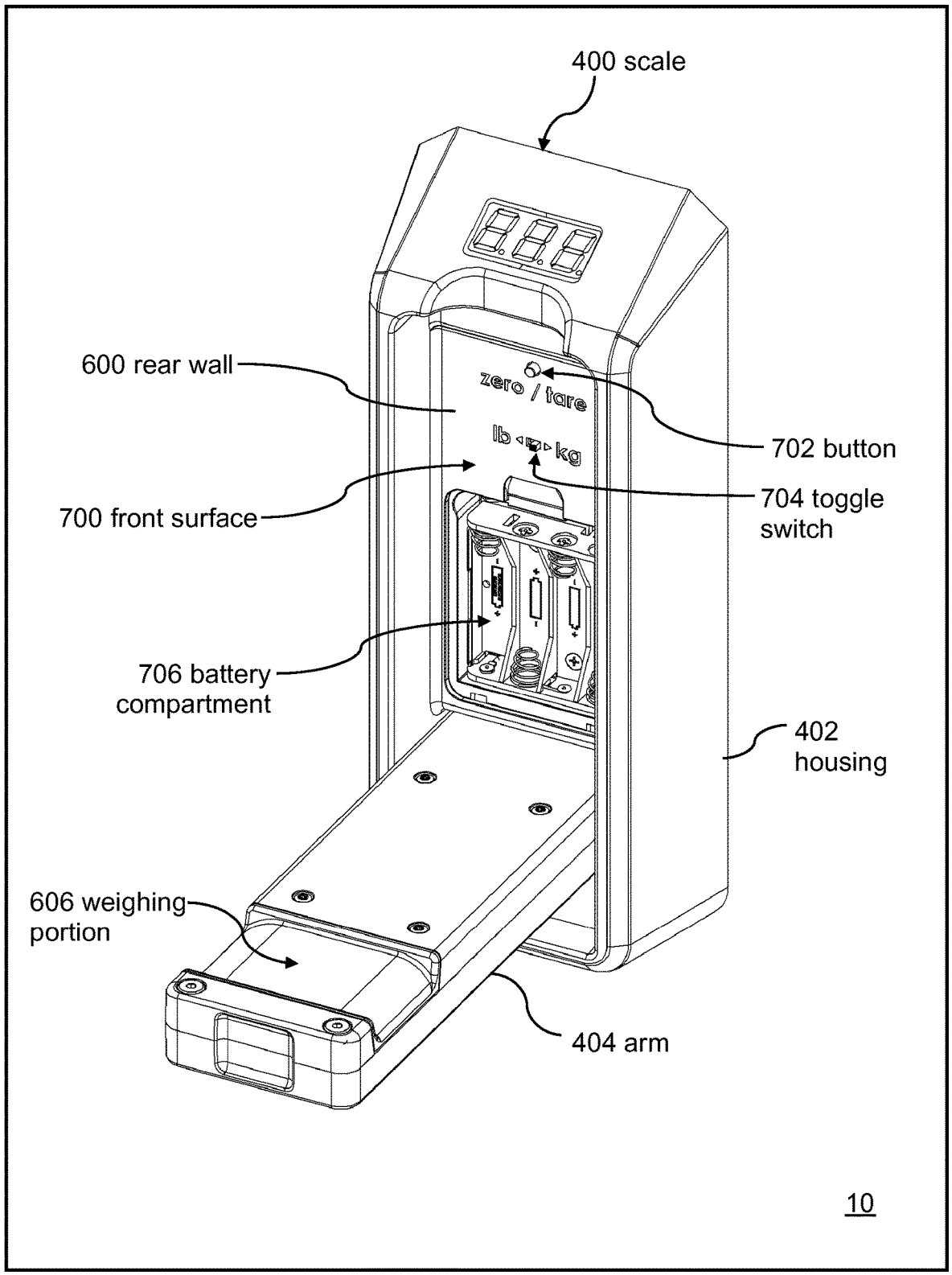
FIG. 7 illustrates a perspective view of the scale in an open position, including a battery compartment, according to some embodiments.

FIG. 7 is similar to FIG. 6 and shows a perspective view of the scale 400 in the open position and mounted on the wall 10. As illustrated, in some embodiments, the rear wall 600 of the housing 402 comprises a front surface 700. The front surface 700 may be thought of as the part of the rear wall 600 that is visible to a user when the scale 400 is mounted on the wall 10 and in the open position with the arm 404 folded down.

In some embodiments, the scale 400 includes a button 702 located on the front surface 700 of the rear wall 600. The button 702 may be configured to tare the scale 400. It should be noted that in this context, to "tare" the scale 400 means removing or disregarding a weight measurement, such as that of a container, before adding the item to be weighed. For example, if a user wanted to use the scale 400 to determine the weight of a pair of shoes, the user could hang a bag from the weighing portion 606 and press the button 702 to tare the scale 400, thereby disregarding the weight of the bag (for example, 0.2 pounds). The user could then place the shoes in the bag so that the scale 400 would measure, and the display 406 would show, only the weight of the shoes, not the combined weight of the shoes and the bag.

The button 702 may also be configured to zero the scale 400. In this context, to "zero" the scale 400 means resetting the weight value, and the display 406, to zero. To continue with the previous example, consider that the user now wants to know the combined weight of the shoes and the bag. If the user removed the bag and the shoes from the weighing portion 606, the display 406 would read "−0.2," or possibly even display an error message because the scale 400 was previously tared with the bag, so the weight of the bag was considered 0.0 rather than 0.2. To fix this issue, the user could remove any items from the weighing portion 606 and thereby press the button 702 to reset the scale 400 back to a true zero. Then, the user could simply hang the bag containing the shoes back on the weighing portion 606, and the display 406 would show the combined weight of the shoes and the bag.

In some embodiments, the scale 400 also includes a toggle switch 704 located on the front surface 700 of the rear wall 600. The toggle switch 704 may be configured to select a unit of measure for the weight shown on the display 406. For example, FIG. 7 shows the toggle switch 704 as able to select either pounds ("lb") or kilograms ("kg"), and specifically illustrates kilograms as the selected unit of measure. It should be noted that the unit of measure may be selected by a mechanism other than a toggle switch, such as a button, multiple buttons, a touchscreen, or any number of other possibilities. It should also be noted that units of measurement other than pounds and kilograms may be selected, including, but not limited to: grams, milligrams, and ounces.

Unlike FIG. 6, FIG. 7 shows the battery compartment cover 608 removed, thereby revealing the battery compartment 706. In some embodiments, the scale 400 is powered by at least one battery within the battery compartment 706. The scale 400 may be configured to turn on when the arm 404 is lowered and/or when weight is sensed on the weighing portion 606. In some embodiments, the scale 400 includes a power button configured to turn on/off the scale 400. The scale 400 may be powered by at least one rechargeable battery. The scale 400 may be powered by any number of battery types, including, but not limited to, traditional alkaline batteries (e.g., A, AA, AAA, C, D), coin or button cell batteries, and lithium-ion batteries, among others. To preserve battery life, the scale 400 may be configured to turn off after a predetermined amount of time without detecting weight. In some embodiments, the predetermined amount of time is 10 seconds. The predetermined amount of time may be about 2 minutes. In some embodiments, the predetermined amount of time is 5 minutes. The predetermined amount of time may be an amount of time other than those specifically stated in this disclosure. In some embodiments, the scale 400 is connected to a power supply of a building (i.e., hardwired to the building), and is thereby powered by the building.

Figure 8:
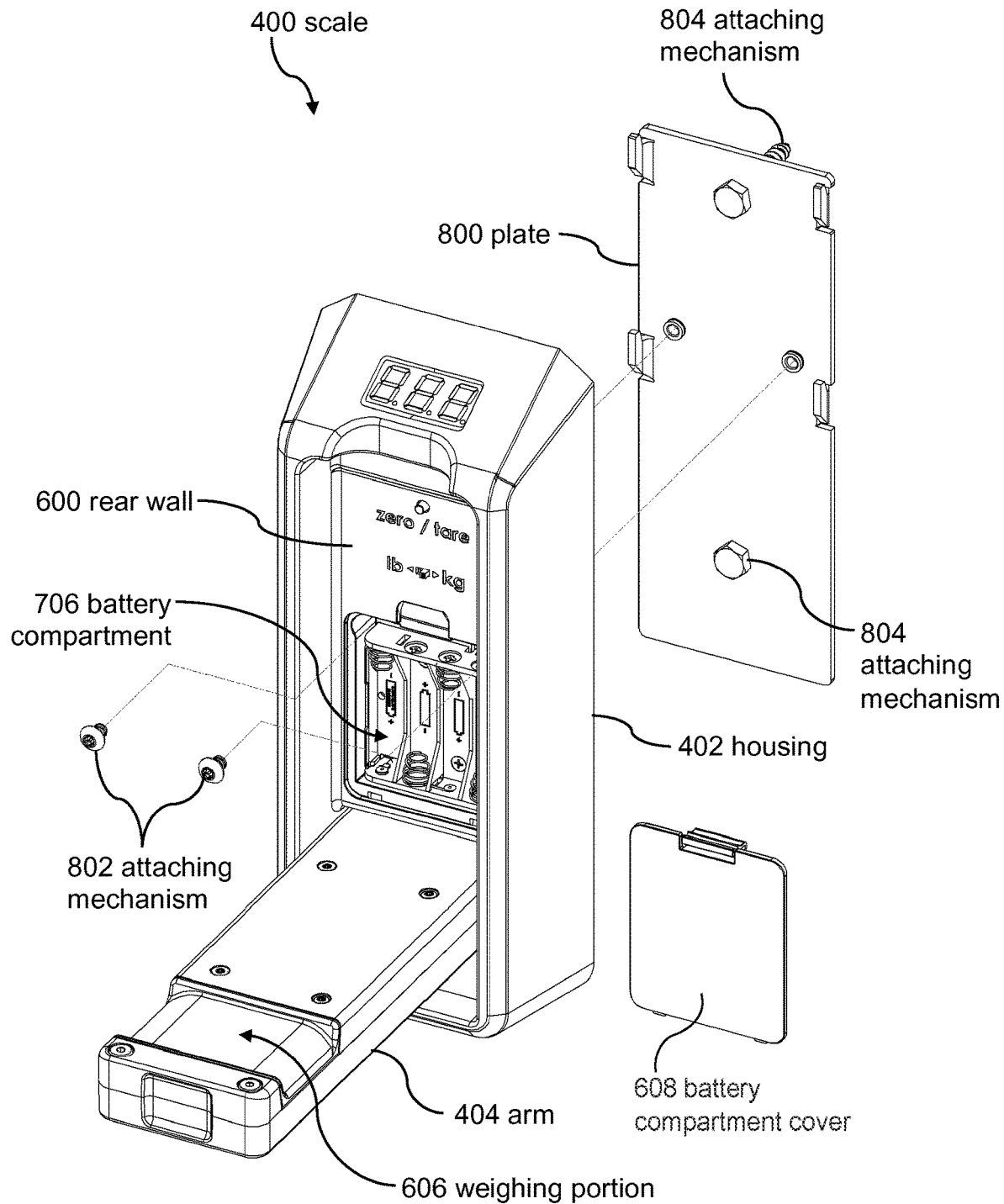
FIG. 8 illustrates an exploded view of the scale, according to some embodiments.

FIG. 8 shows an exploded view of the scale 400. In some embodiments, the scale 400 includes a plate 800 removably coupled to a back surface of the rear wall 600. The plate 800 may be coupled to the rear wall 600 via at least one attaching mechanism 802. In some embodiments, the at least one attaching mechanism 802 comprises at least one screw, as illustrated in FIG. 8. The at least one attaching mechanism 802 may comprise any suitable type of fastener. In some embodiments, the at least one attaching mechanism 802 couples to the plate 800 through the battery compartment 706. The at least one attaching mechanism 802 may couple to the plate 800 through the front surface 700 of the rear wall 600. The plate 800 may couple to the rear wall 600 by a method other than the at least one attaching mechanism 802. For example, at least one clip of the plate 800 may be received by, or otherwise couple to, the housing 402. In some embodiments, the plate 800 couples to the rear wall 600 with a combination of the at least one attaching mechanism 802 and another method.

FIG. 8 also shows another attaching mechanism 804. In some embodiments, the plate 800 is configured to couple to a wall of a building via the at least one attaching mechanism 804, thereby coupling the scale 400 to the wall of the building. The attaching mechanism 804 may comprise a threaded fastener, such as a bolt, screw, or similar fastener. The attaching mechanism 804 may comprise a different type of fastener, such as hook and loop fastener or adhesive. In some embodiments, a user first couples the plate 800, via the at least one attaching mechanism 804, to the wall of the building, then couples the housing 402 to the plate 800 via the at least one attaching mechanism 802.

Figure 9:
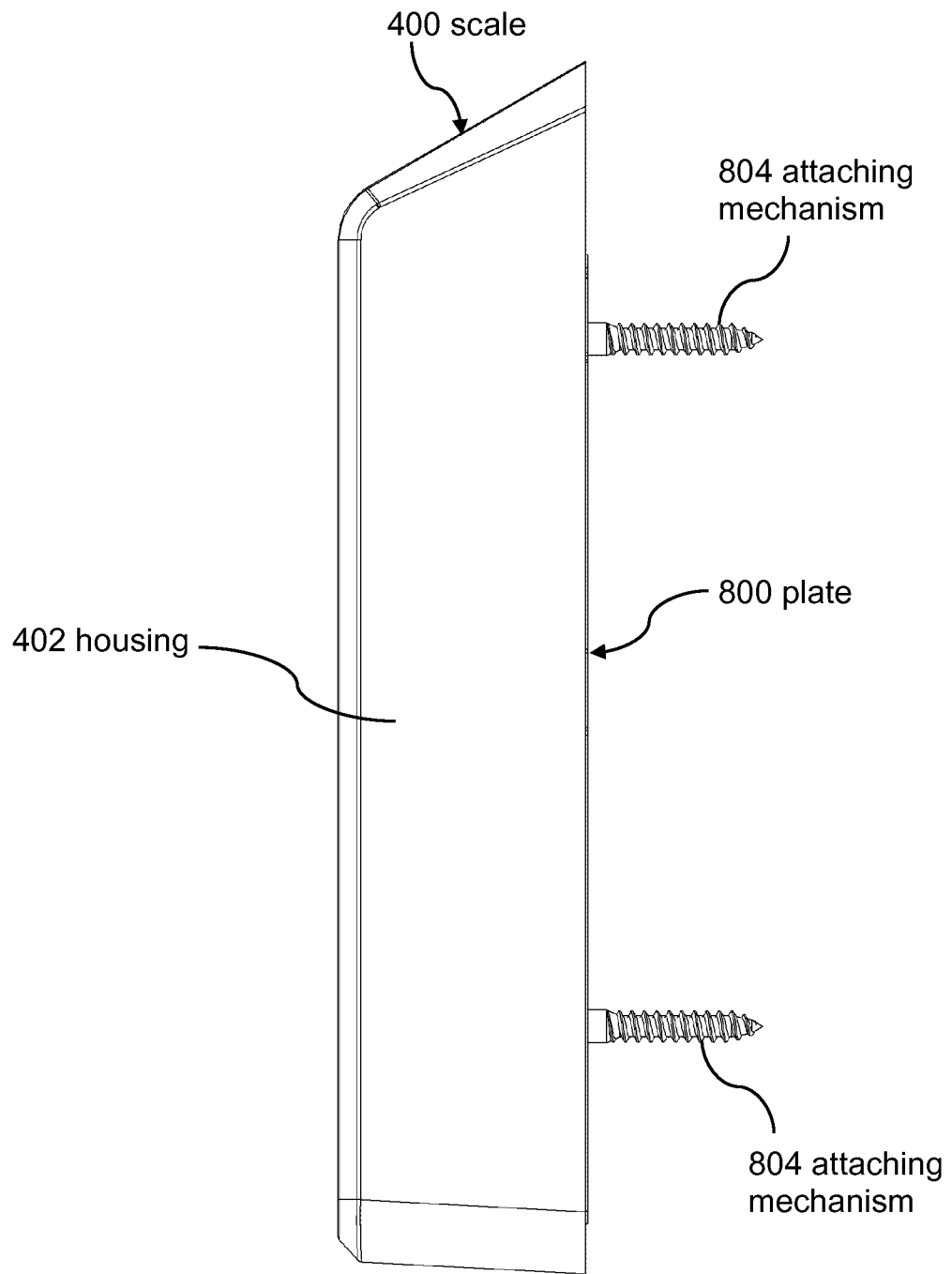
FIG. 9 illustrates a side view of the scale, according to some embodiments.

FIG. 9 illustrates a side view of the scale 400, including the attaching mechanism 804 protruding from the plate 800. In some embodiments, as shown in FIGS. 8 and 9, the plate 800 is configured to receive two attaching mechanisms 804 in order to couple to a wall (or other suitable surface). The plate 800 may be configured to use a single attaching mechanism 804 to couple to another surface. In some embodiments, the plate 800 uses more than two attaching mechanisms 804 to couple to another surface.

Figure 10:
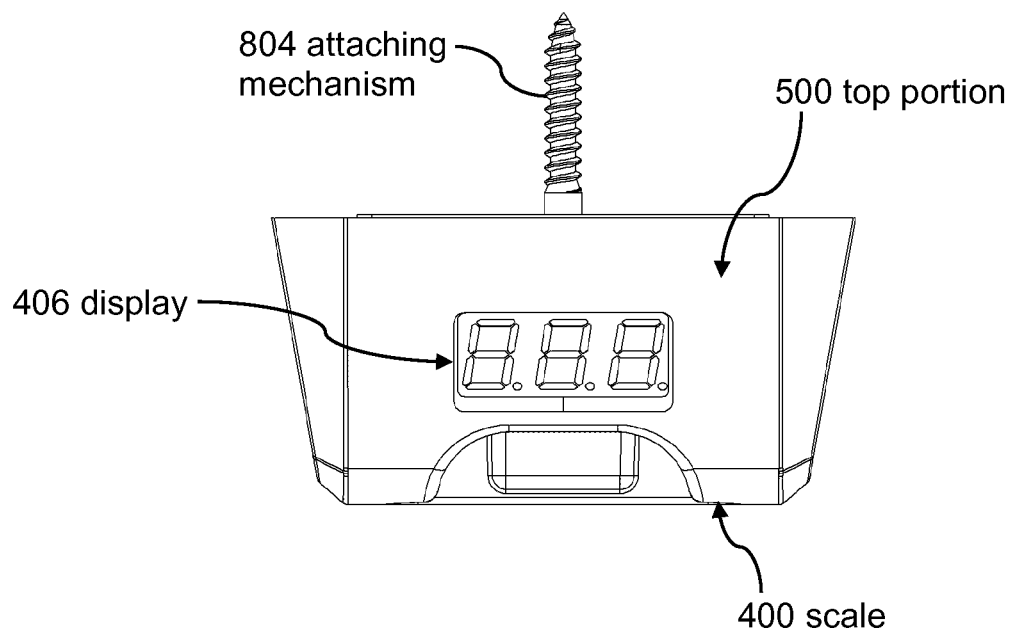
FIG. 10 illustrates a top view of the scale, according to some embodiments.

FIG. 10 shows a top view of the scale 400, including the display 406 on the top portion 500 of the housing 402. FIG. 10 also shows one attaching mechanism 804. In some embodiments, the display 406 includes three digits. The display 406 may include fewer than three digits. The display 406 may include more than three digits, as will be discussed with reference to FIGS. 21 and 22.

Figure 11:
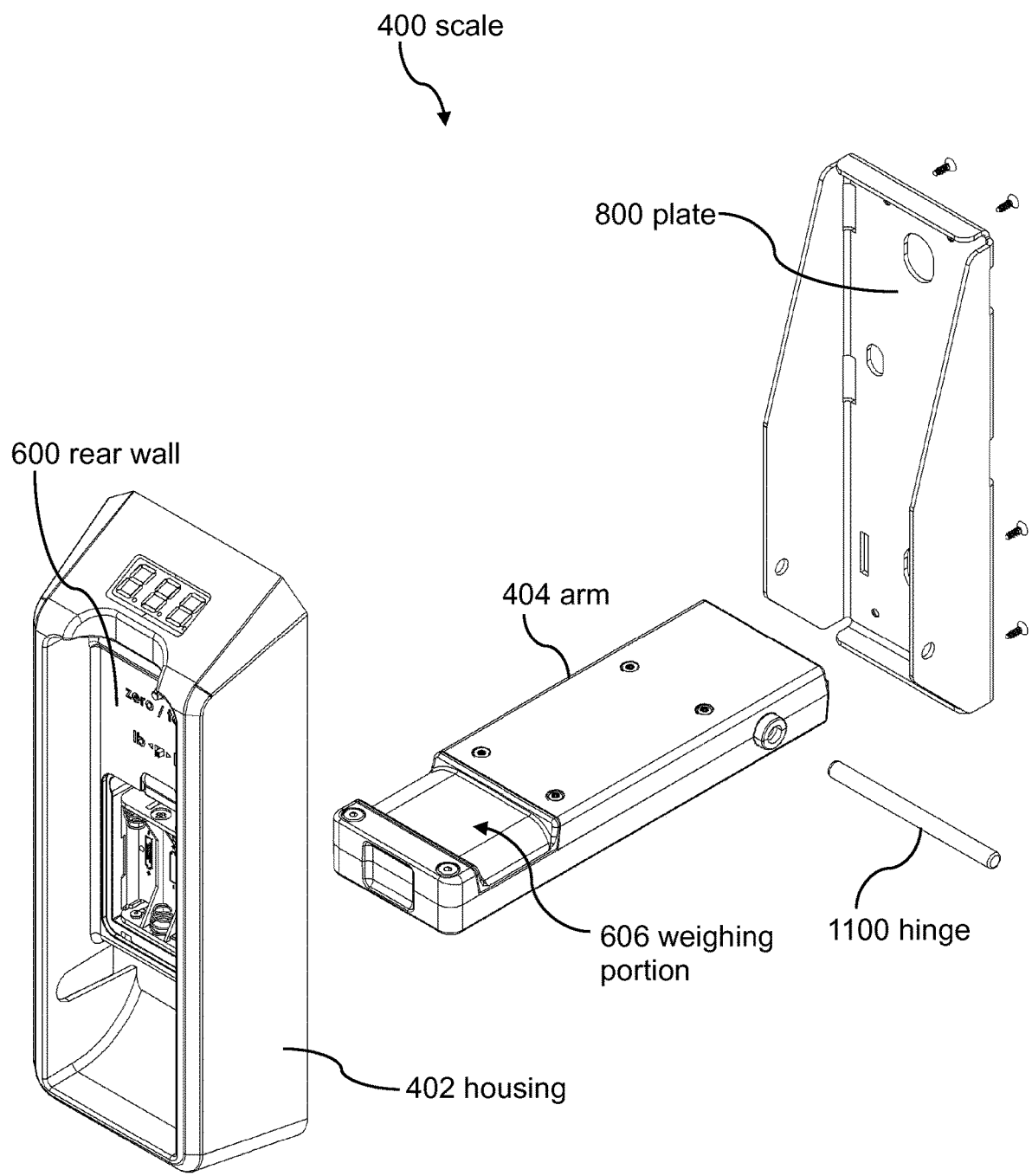
FIG. 11 illustrates an exploded view of the scale, according to some embodiments.

FIG. 11 shows another exploded view of the scale 400, including the housing 402, the arm 404, and the plate 800. As previously mentioned, the arm 404 may be hingedly coupled to the housing 402. FIG. 11 shows the hinge 1100, which may be received by the arm 404 and configured to couple to the housing 402. In some embodiments, the arm 404 is hingedly coupled to the rear wall 600. The arm 404 may be hingedly coupled to the housing 402 below the rear wall 600. In some embodiments, the housing 402 includes a portion, such as a track or channel, configured to receive at least a portion of the arm 404. The channel may be configured to receive the hinge 1100. It should be noted that the arm 404 may be coupled to the housing 402 by a mechanism other than the hinge 1100.

Figure 12:
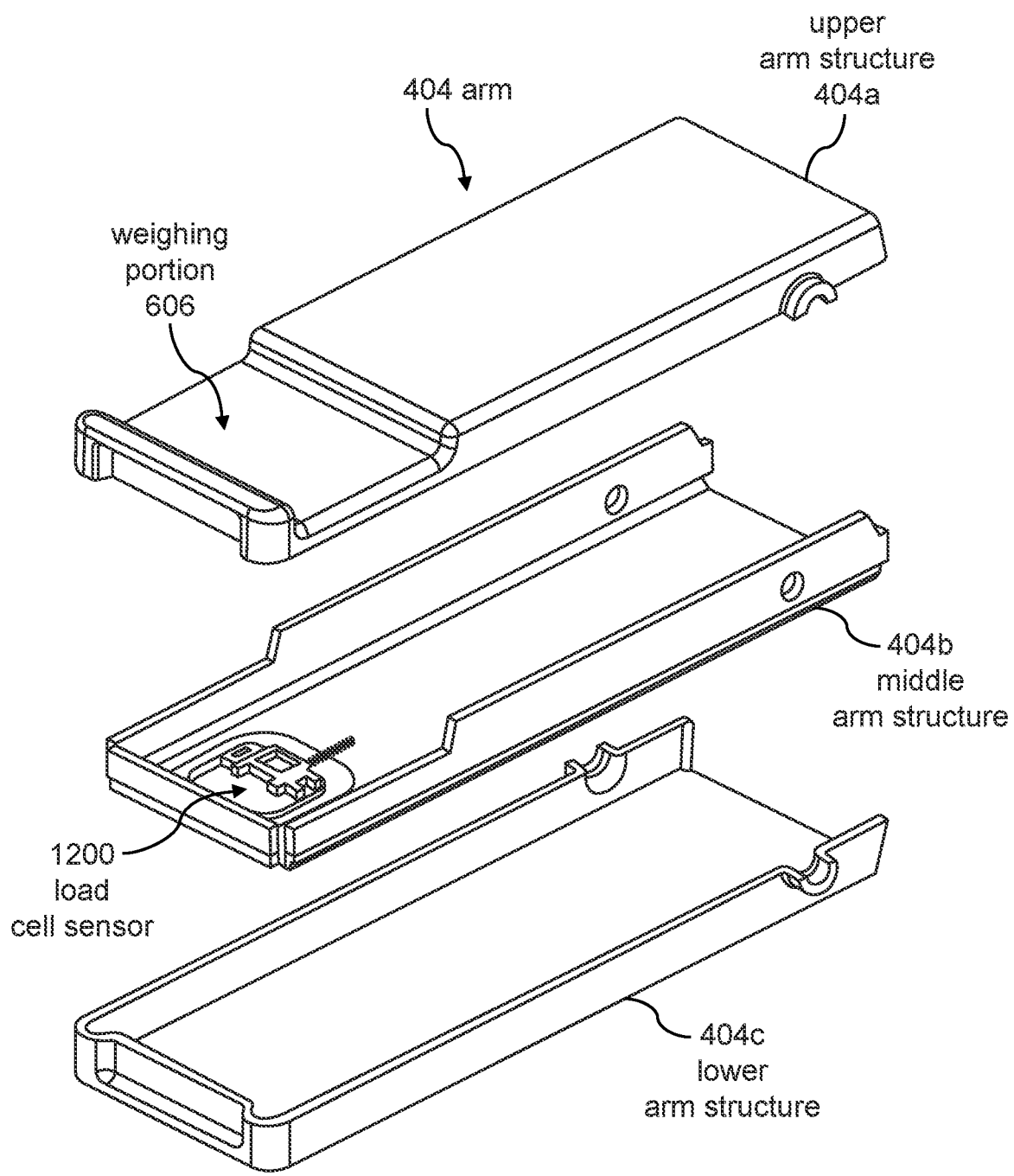
FIG. 12 illustrates an exploded view of an arm of the scale, according to some embodiments.

FIG. 12 illustrates an exploded view of the arm 404. In some embodiments, the arm 404 comprises an upper arm structure 404a, a middle arm structure 404b, and a lower arm structure 404c. The upper arm structure 404a and the lower arm structure 404c may be configured to couple together with the middle arm structure 404b located between, and inside of, the upper arm structure 404a and the lower arm structure 404c. Accordingly, the upper arm structure 404a and the lower arm structure 404c may be considered exterior structures, while the middle arm structure 404b may be considered an interior structure.

FIG. 12 also shows the weighing portion 606 and illustrates its recessed nature, as compared to the rest of the arm 404. Also included in FIG. 12 is the load cell sensor 1200. In some embodiments, the load cell sensor 1200 is one of the components involved in measuring the weight of an item received by the weighing portion 606. The load cell sensor 1200 may operate similarly to the load cell sensor 320, discussed earlier in this disclosure with reference to the device 100.

Figure 13:
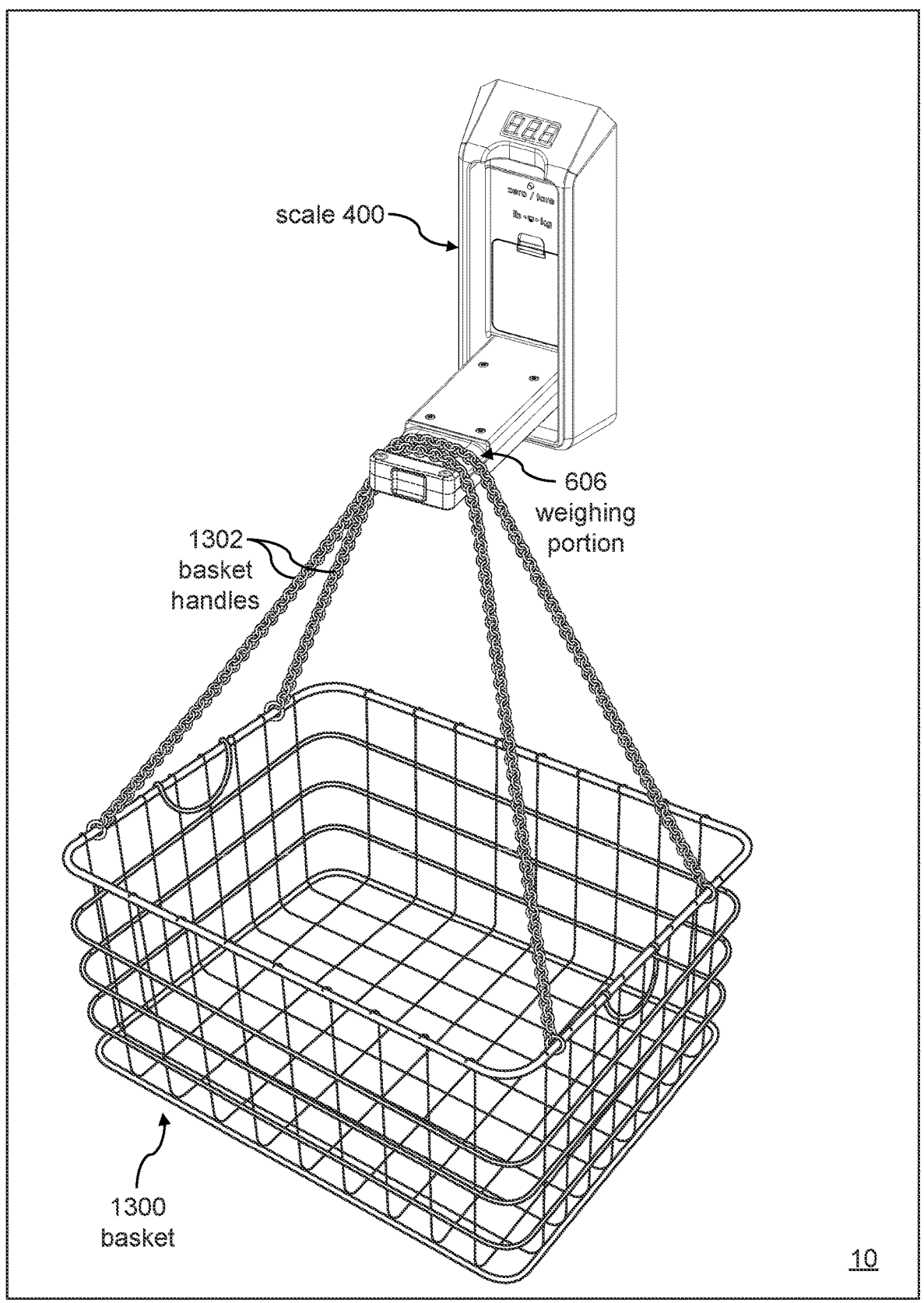
FIG. 13 illustrates a perspective view of a basket hanging from the scale, according to some embodiments.

In some embodiments, the weighing portion 606 of the scale 400 is configured to receive a secondary device configured to hold an item to be weighed. As illustrated in FIG. 13, the secondary device may comprise a basket 1300. The basket 1300 may be configured to hold any number of items, depending on the use context of the scale 400. For example, if the scale 400 is installed in a grocery store, the basket 1300 may be configured to hold produce to allow shoppers to determine the weight of the produce prior to purchasing it. FIG. 13 also illustrates a use case where the button 702 would be used to tare the scale 400—by taring the scale 400 to disregard the weight of the basket 1300, shoppers can be sure that the weight displayed by the scale 400 is that of the produce only, not that basket and the produce. The basket 1300 can be used to weigh items by hanging the basket 1300, via the basket handles 1302, from the weighing portion 606 of the scale 400. In some embodiments, the weighing portion 606 includes some kind of bracket or similar holder to secure the basket handles 1302 in one spot and prevent the basket handles 1302 from slipping—and the basket 1300 from tipping—if weight is not distributed evenly across the surface of the basket 1300.

Figure 14:
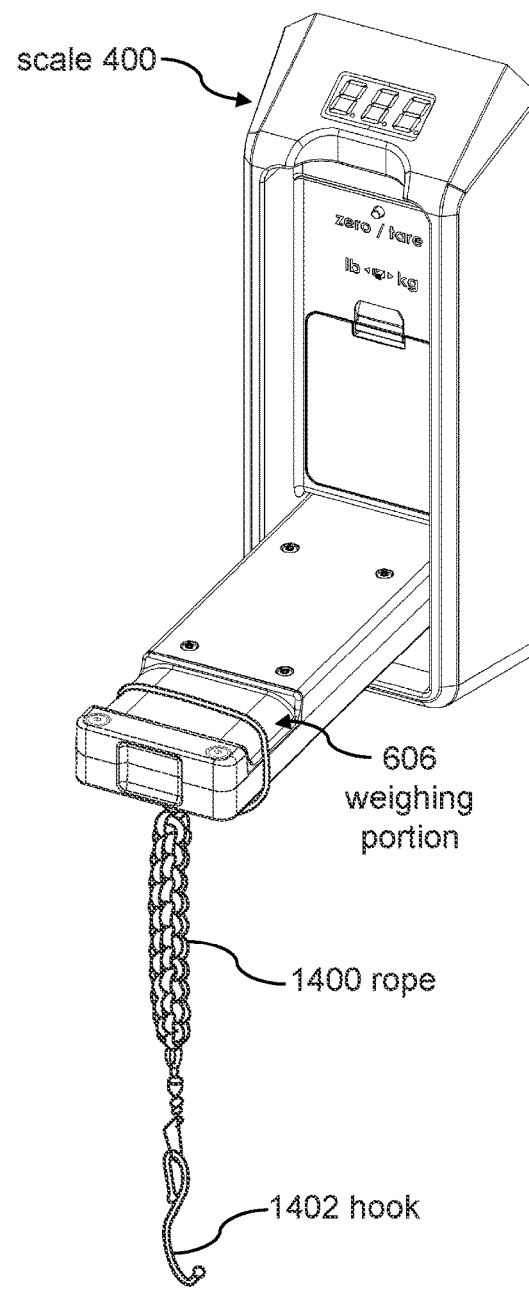
FIG. 14 illustrates a perspective view of a rope and hook hanging from the scale, according to some embodiments.

FIG. 14 illustrates another embodiment of a secondary device configured to hang from the scale 400. As shown, a rope 1400 with a hook 1402 on the end may be configured to hang from the weighing portion 606, and an item to be weighed may, in turn, hang from the hook 1402 to be weighed by the scale 400. In some embodiments, the hook 1402 comprises a barbless hook to prevent damage to the item to be weighed. For example, the scale 400 may be mounted on a wall 10 of a restaurant, fish market, or fishing boat, and the hook 1402 may hook into the mouth or gills of a fish so that the scale 400 can weigh the fish. The rope 1400 and the hook 1402 may also be used in farming or food processing facilities to weigh other small animals, such as poultry.

Figure 15:
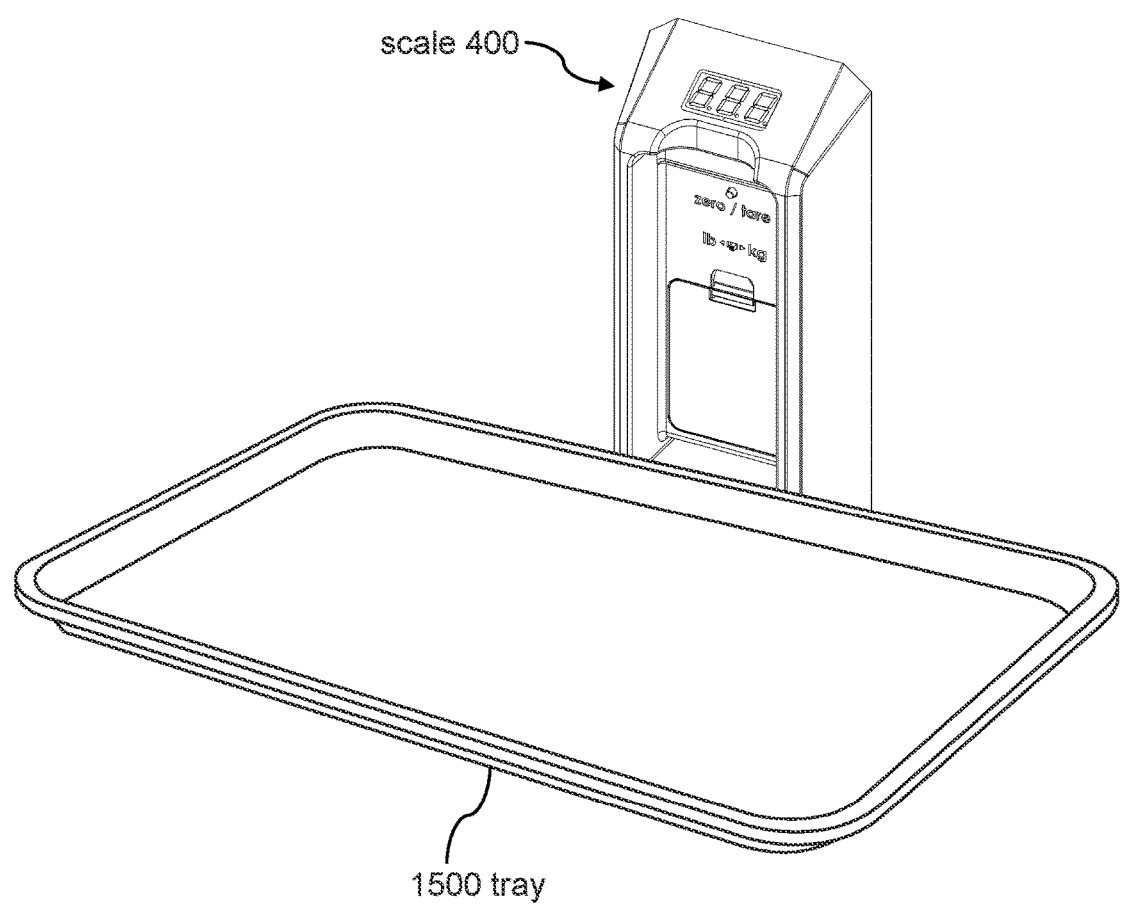
FIG. 15 illustrates a perspective view of the scale with a tray mounted on the arm, according to some embodiments.

FIG. 15 shows the scale 400 with a tray 1500 mounted on top. In some embodiments, the tray 1500 comprises another secondary device configured to couple to the scale 400 to receive an item to be weighed. For example, the tray 1500 may be configured to hold cosmetics, produce, or other bulk goods (e.g., bagged nuts or candy) when the scale 400 is used in a retail context. The scale 400 may also be used in homes, bakeries, or restaurants, and the tray 1500 can be configured to hold ingredients, like flour or sugar, that are best measured by weight. In some embodiments, the tray 1500 is coupled to a mounting device, which, in turn, is coupled to the weighing portion 606 of the scale 400, in order to direct the weight on the tray 1500 to the weighing portion 606, rather than across the arm 404.

Figure 16:
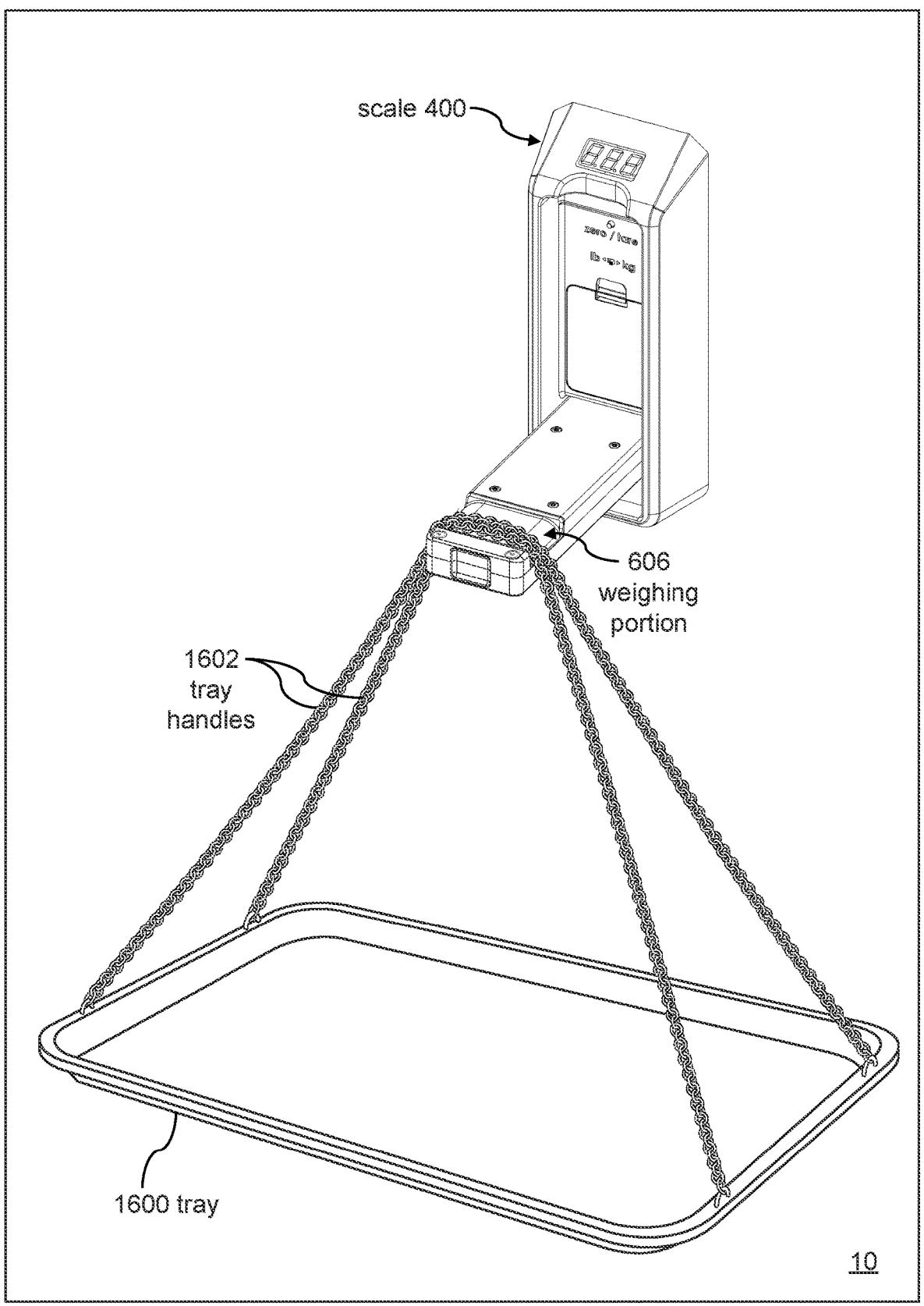
FIG. 16 illustrates a perspective view of the scale with a tray hanging from the arm, according to some embodiments.

FIG. 16 is similar to FIG. 15 but shows a tray 1600 hanging from the weighing portion 606 rather than mounted on top, like the tray 1500. Similar to the basket 1300, the tray 1600 may include tray handles 1602 configured to hang from the weighing portion 606. In some embodiments, the weighing portion 606 includes some kind of bracket or similar holder to secure the tray handles 1602 in one spot and prevent the tray handles 1602 from slipping—and the tray 1600 from tipping—if weight is not distributed evenly across the surface of the tray 1600. As discussed with reference to FIG. 15, the tray 1600 may be used in both residential and commercial contexts to weigh a variety of items that can be placed on the tray 1600. It should be noted that the tray 1500 and/or the tray 1600 may define a size other than what is shown in the figures. In addition, the tray 1500 and/or the tray 1600 may be comprised of food-safe materials and may be washable to ensure sanitary handling of food, such as when using the tray 1500 and/or the tray 1600 to weigh ingredients for cooking or baking.

Figure 17:
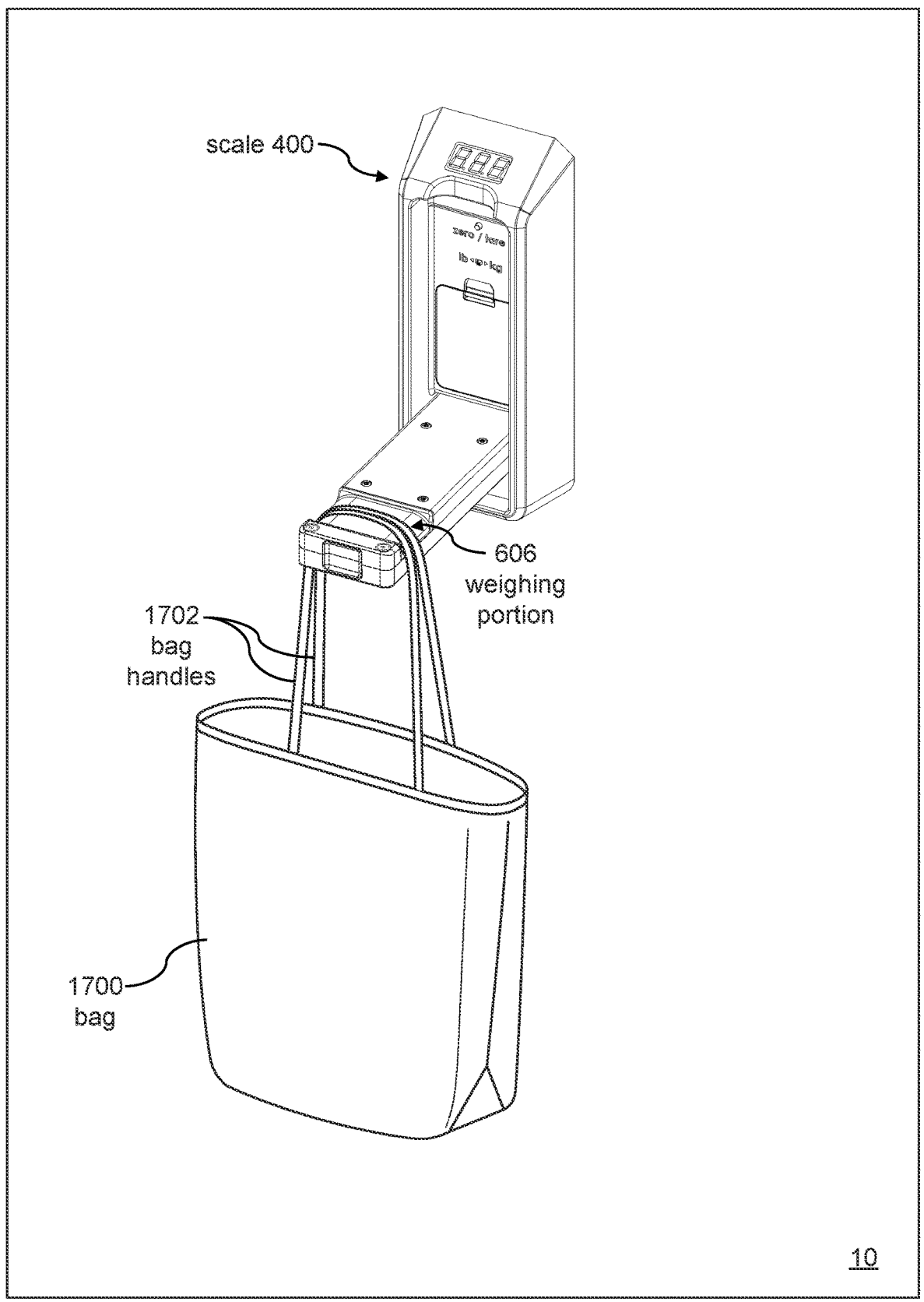
FIG. 17 illustrates a perspective view of a bag hanging from the scale, according to some embodiments.

FIG. 17 illustrates another example of a secondary device—the bag 1700. In some embodiments, the bag handles 1702 are configured to hang from the weighing portion 606 so that item(s) can be placed in the bag 1700 to be weighed by the scale 400. In some embodiments, the weighing portion 606 includes some kind of bracket or similar holder to secure the bag handles 1702 in one spot and prevent the bag handles 1702 from slipping—and the bag 1700 from tipping—if weight is not distributed evenly within the bag 1700. The bag 1700 may be comprised of a number of suitable materials and may define a number of sizes.

Figure 18:
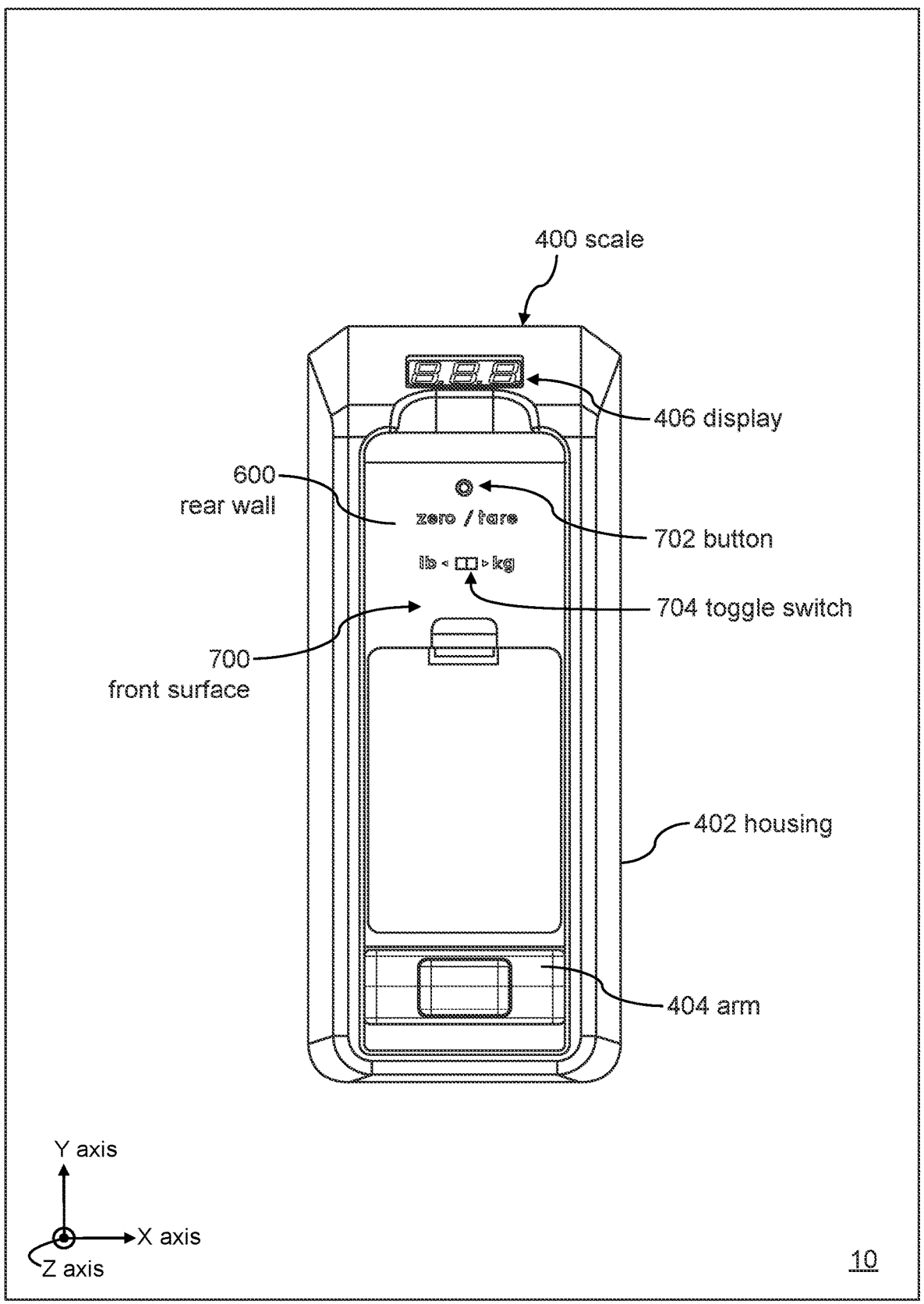
FIG. 18 illustrates a front view of the scale in an open position, according to some embodiments.

FIG. 18 shows a front view of the scale 400 coupled to a wall 10. FIG. 18 is similar to previous figures, including FIG. 6, and shows the rear wall 600, as well as the button 702 and the toggle switch 704 coupled to the front surface 700. FIG. 18 also includes the arm 404 extending straight out the front of the housing 402, along the Z axis of the page, as shown by the directional indicator in FIG. 18.

Figure 19:
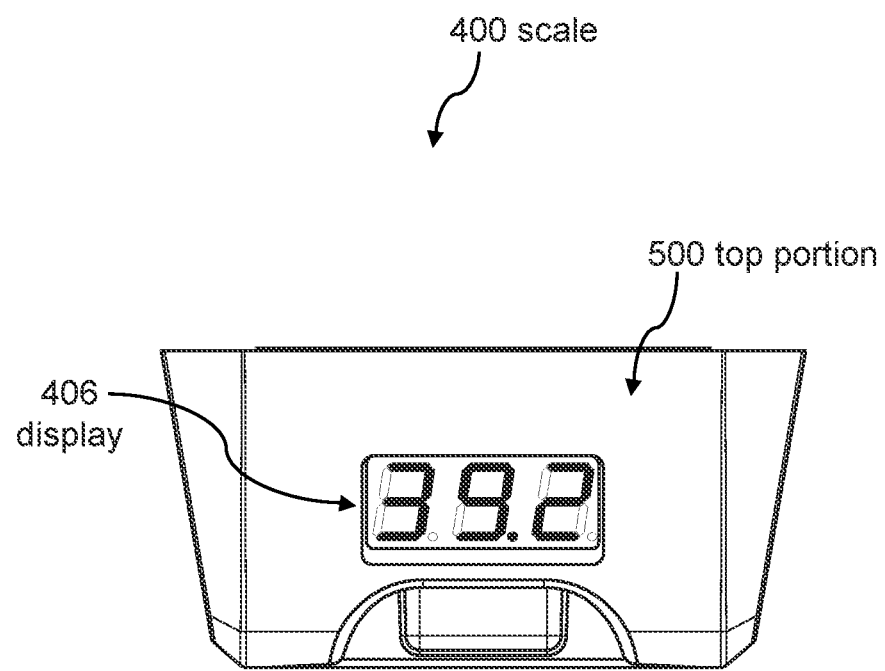
FIGS. 19, 20, and 21 illustrate top views of the scale displaying different weights, according to some embodiments.
Figure 20:
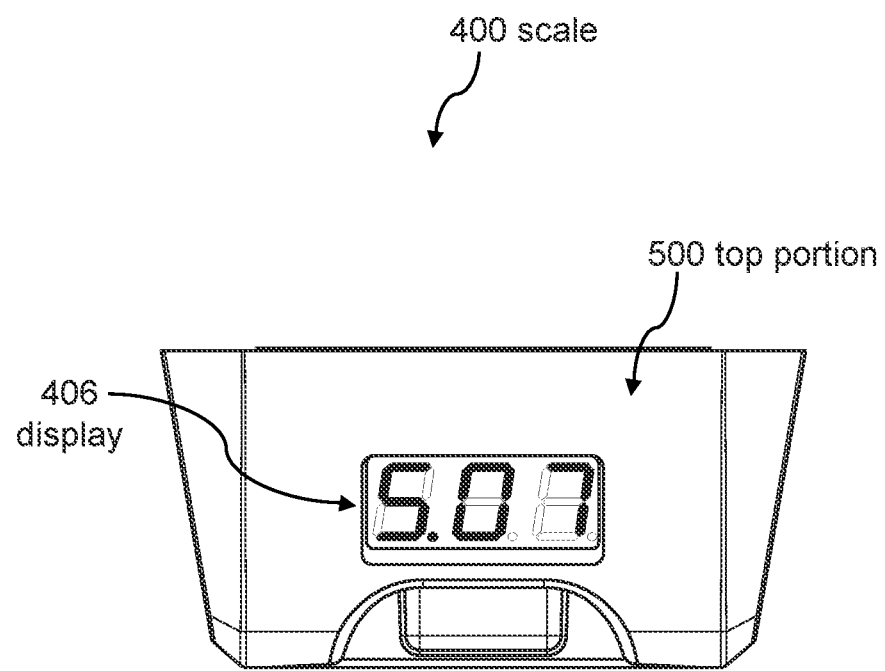
Figure 21:
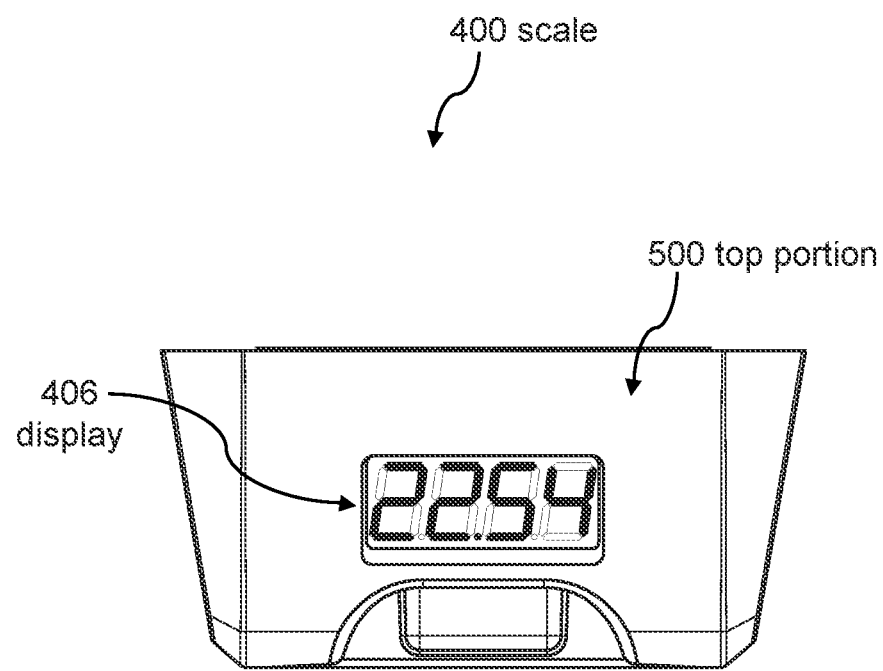

FIGS. 19, 20, and 21 each illustrate a top view of the scale 400, with different numbers shown on the display 406. It should be noted that, in order to focus on the display 406, the arm 404 is not shown in FIGS. 19-21. As demonstrated in FIG. 19, where the display 406 shows the number 39.2, the display 406 may comprise three digits and be configured to show one decimal place. In some embodiments, as demonstrated in FIG. 20, where the display 406 shows the number 5.07, the display 406 comprises three digits and is configured to show two decimal places. The display 406 may comprise four digits, as shown in FIG. 21, where the display 406 shows the number 22.54. In an embodiment where the display 406 comprises four digits, the display 406 may be configured to show zero, one, two, or three decimal places.

Figure 22:
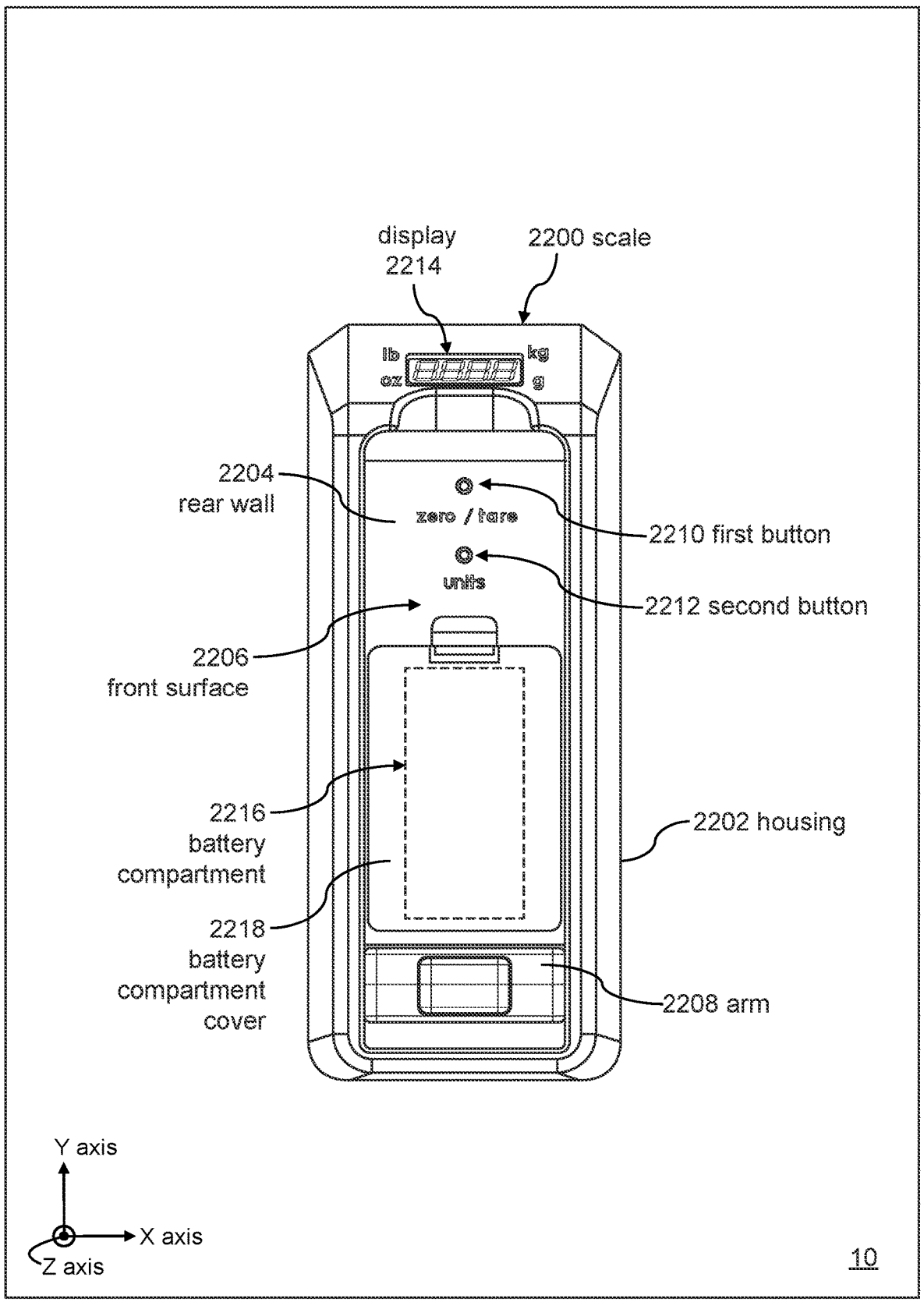
FIG. 22 illustrates a front view of a scale in an open position, according to some embodiments.

FIG. 22 shows a scale 2200. The scale 2200 may be similar to the scale 400 in that it comprises similar features, such as a housing 2202, a rear wall 2204, a display 2214, and an arm 2208, illustrated coming straight out of the housing 2202, along the Z axis of the page, as shown by the directional indicator in FIG. 22. The scale 2200 may also include a first button 2210 on the front surface 2206 configured to tare/zero the scale 2200, similar to the button 702. Rather than the toggle switch 704, the scale 2200 may include a second button 2212 on the front surface 2206 configured to select the units of measurement.

In some embodiments, the scale 2200 is configured to measure and display weight in at least one of four possible measurements: pounds, kilograms, ounces, and grams. As shown in FIG. 22, the possible units of measurement may be written around the display 2214. In some embodiments, the selected unit of measurement is indicated by the illumination of one of the terms. For example, when the second button 2212 is pressed, the labels around the display 2214 may take turns glowing to indicate which unit is selected. Alternatively, the display 2214 may include a dot or other symbol configured to illuminate in each corner of the display 2214 corresponding to each possible unit. It should be noted that rather than a button, the units of measurement may be selected by multiple buttons, one or more toggle switches, a touchscreen, or the like. In some embodiments, the scale 2200 includes a display 2214 having four digits, like the display 406 shown in FIG. 21.

FIG. 22 also includes a battery compartment 2216 and a battery compartment cover 2218. Like the scale 400, the scale 2200 may be powered by at least one battery within the battery compartment 2216. The scale 2200 may be configured to turn on when the arm 2208 is lowered and/or when weight is sensed on the weighing portion of the arm 2208. In some embodiments, the scale 2200 includes a power button configured to turn on/off the scale 2200. The scale 2200 may be powered by at least one rechargeable battery. The scale 2200 may be powered by any number of battery types, including, but not limited to, traditional alkaline batteries (e.g., A, AA, AAA, C, D), coin or button cell batteries, and lithium-ion batteries. To preserve battery life, the scale 2200 may be configured to turn off after a predetermined amount of time without detecting weight. In some embodiments, the predetermined amount of time is 10 seconds. The predetermined amount of time may be about 2 minutes. In some embodiments, the predetermined amount of time is 5 minutes. The predetermined amount of time may be an amount of time other than those specifically stated in this disclosure. In some embodiments, the scale 2200 is connected to a power supply of a building (i.e., hardwired to the building), and is thereby powered by the building.

In some embodiments, the scale 2200 has a maximum weight capacity of about 25 pounds. The scale 400 may have a maximum weight capacity of about 100 pounds. In some embodiments, the scale 2200 defines smaller dimensions than the scale 400. In addition to the use cases described above, the scale 400 and/or the scale 2200 may be located in hotels, resorts, airports, and on cruise ships, as well as in short-term rental vacation homes. The scale 400 and/or the scale 2200 may be used to weigh sporting goods such as bicycles (by balancing the bike seat on the weighing portion), backpacks, and hunting equipment.

Figure 23A:
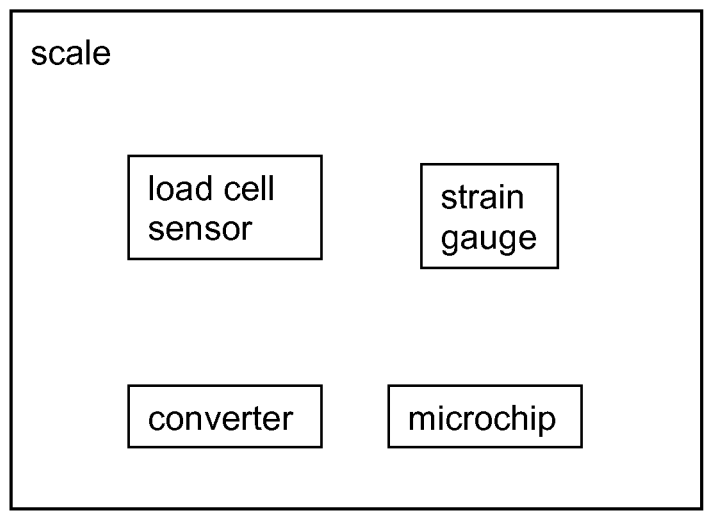
FIGS. 23A and 23B illustrate block diagrams of the scale, according to some embodiments.
Figure 23B:
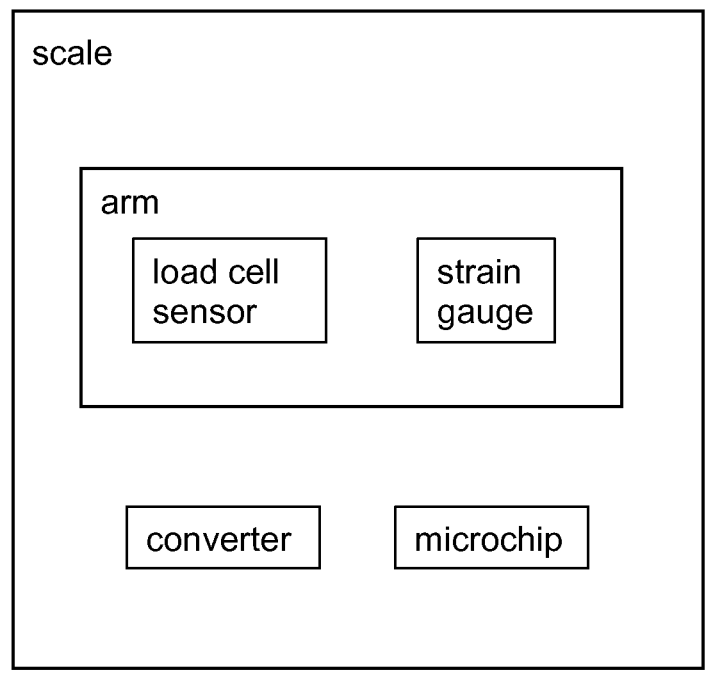

FIGS. 23A and 23B show block diagrams of a scale. It should be noted that FIGS. 23A and 23B apply to both the scale 400 and the scale 2200. In some embodiments, as shown in FIG. 23A, the scale includes a load cell sensor, a strain gauge, a converter, and a microchip. As shown in FIG. 23B, the arm of the scale may comprise the load cell sensor and the strain gauge, while the converter and the microchip may be located elsewhere on the scale.

Figure 24:
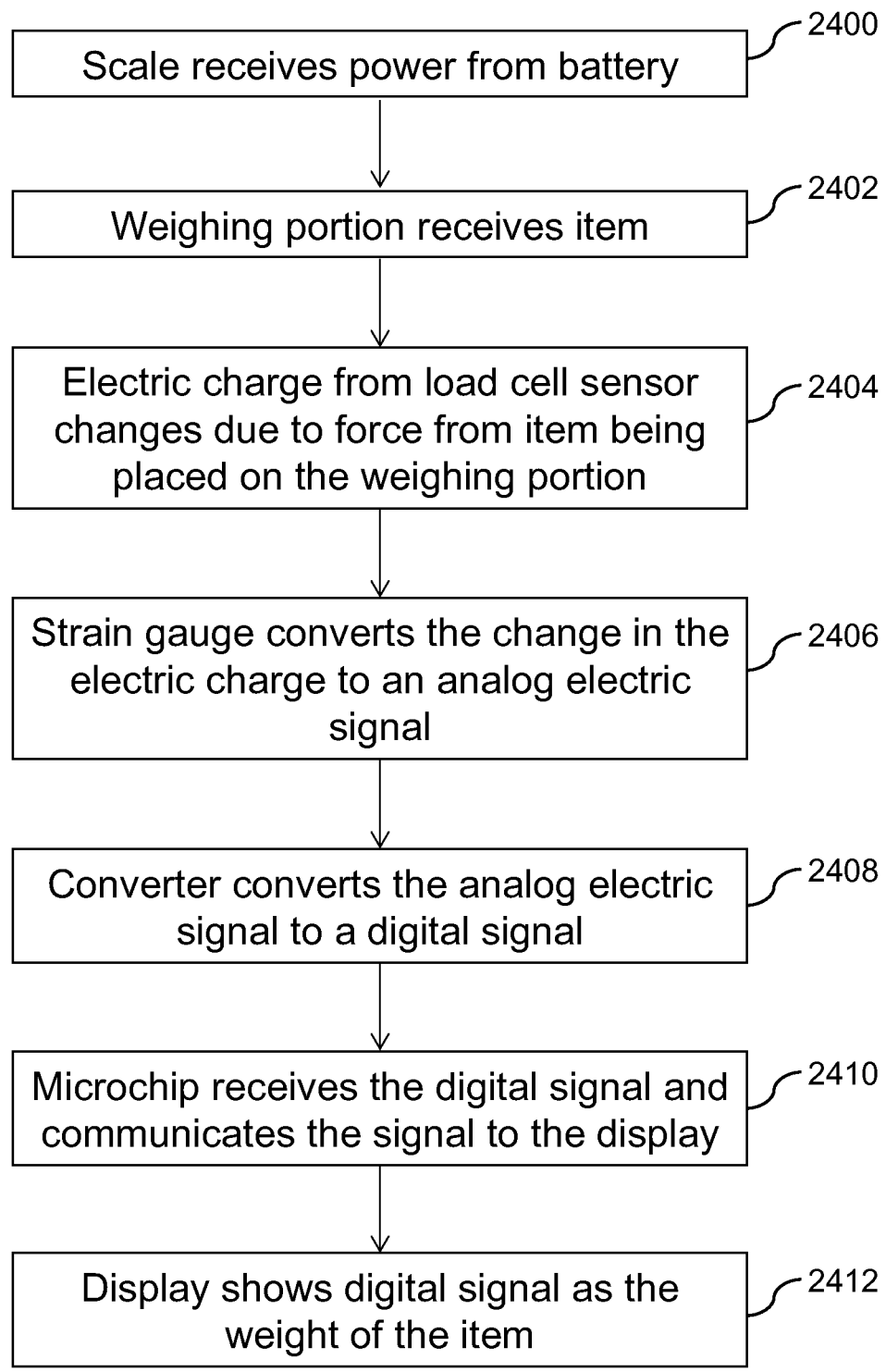
FIG. 24 illustrates a flowchart of the operation of the scale, according to some embodiments.

FIG. 24 shows a flowchart of operation of a scale. Like FIGS. 23A and 23B, FIG. 24 may be considered as referring to both the scale 400 and the scale 2200. In some embodiments, operation begins with the scale receiving power from at least one battery, at Step 2400. Upon the scale receiving power, the load cell sensor may receive an electric charge. Then, the weighing portion receives an item, at Step 2402. The electric charge from the load cell sensor may change due to the force from the item being placed on the weighing portion, at Step 2404. In some embodiments, the strain gauge converts the change in the electric charge to an analog electric signal, at Step 2406. The converter may convert the analog electric signal to a digital signal, at Step 2408. In some embodiments, the microchip receives the digital signal and communicates the signal to the display, at Step 2410. Finally, the display shows the digital signal as the weight of the item, at Step 2412.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "luggage scale device" and "device" are interchangeable and refer to the luggage scale device 100 of the present invention.

Notwithstanding the foregoing, the luggage scale device 100 of the present invention and its various components can be of any suitable size and configuration as is known in the art without affecting the overall concept of the invention, provided that they accomplish the above-stated objectives. One of ordinary skill in the art will appreciate that the size, configuration, and material of the luggage scale device 100 as shown in the FIGS. are for illustrative purposes only, and that many other sizes and shapes of the luggage scale device 100 are well within the scope of the present disclosure. Although the dimensions of the luggage scale device 100 are important design parameters for user convenience, the luggage scale device 100 may be of any size, shape and/or configuration that ensures optimal performance during use and/or that suits the user's needs and/or preferences.

Some of the components listed herein use the same number from figure to figure. It should be appreciated these components use the same numbers solely for ease of reference and to facilitate comprehension for the reader. While these components may use the same numbers, differences may be present in these components as illustrated in the various figures in which they appear and as described in the specification herein.

None of the steps described herein is essential or indispensable. Any of the steps can be adjusted or modified. Other or additional steps can be used. Any portion of any of the steps, processes, structures, and/or devices disclosed or illustrated in one embodiment, flowchart, or example in this specification can be combined or used with or instead of any other portion of any of the steps, processes, structures, and/or devices disclosed or illustrated in a different embodiment, flowchart, or example. The embodiments and examples provided herein are not intended to be discrete and separate from each other.

The section headings and subheadings provided herein are nonlimiting. The section headings and subheadings do not represent or limit the full scope of the embodiments described in the sections to which the headings and subheadings pertain. For example, a section titled "Topic 1" may include embodiments that do not pertain to Topic 1 and embodiments described in other sections may apply to and be combined with embodiments described within the "Topic 1" section.

The various features and processes described above may be used independently of one another, or may be combined in various ways. All possible combinations and subcombinations are intended to fall within the scope of this disclosure. In addition, certain method, event, state, or process blocks may be omitted in some implementations. The methods, steps, and processes described herein are also not limited to any particular sequence, and the blocks, steps, or states relating thereto can be performed in other sequences that are appropriate. For example, described tasks or events may be performed in an order other than the order specifically disclosed. Multiple steps may be combined in a single block or state. The example tasks or events may be performed in serial, in parallel, or in some other manner. Tasks or events may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require at least one of X, at least one of Y, and at least one of Z to each be present.

The term "and/or" means that "and" applies to some embodiments and "or" applies to some embodiments. Thus, A, B, and/or C can be replaced with A, B, and C written in one sentence and A, B, or C written in another sentence. A, B, and/or C means that some embodiments can include A and B, some embodiments can include A and C, some embodiments can include B and C, some embodiments can only include A, some embodiments can include only B, some embodiments can include only C, and some embodiments can include A, B, and C. The term "and/or" is used to avoid unnecessary redundancy.

Also define any other terms used in the application (i.e., "about," "substantially," "adjacent," etc.)

The foregoing may be accomplished through software code running in one or more processors on a communication device in conjunction with a processor in a server running complementary software code.

Some of the devices, systems, embodiments, and processes use computers. Each of the routines, processes, methods, and algorithms described in the preceding sections may be embodied in, and fully or partially automated by, code modules executed by one or more computers, computer processors, or machines configured to execute computer instructions. The code modules may be stored on any type of non-transitory computer-readable storage medium or tangible computer storage device, such as hard drives, solid state memory, flash memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

It is appreciated that in order to practice the method of the foregoing as described above, it is not necessary that the processors and/or the memories of the processing machine be physically located in the same geographical place. That is, each of the processors and the memory (or memories) used by the processing machine may be located in geographically distinct locations and connected so as to communicate in any suitable manner. Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the foregoing, be performed by a single component. Further, the processing performed by one distinct component as described above may be performed by two distinct components. In a similar manner, the memory storage performed by two distinct memory portions, as described above, may, in accordance with a further embodiment of the foregoing, be performed by a single memory portion. Further, the memory storage, performed by one distinct memory portion, as described above, may be performed by two memory portions.

Further, various technologies may be used to provide communication between the various processors and/or memories, as well as to allow the processors and/or the memories of the foregoing to communicate with any other entity, i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the foregoing. The set of instructions may be in the form of a program or software. The software may be in the form of system software or application software, for example. The software might also be in the form of a collection of separate programs, a program module within a larger program, or a portion of a program module, for example. The software used might also include modular programming in the form of object-oriented programming. The software may instruct the processing machine what to do with the data being processed.

Further, it is appreciated that the instructions or set of instructions used in the implementation and operation of the foregoing may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the foregoing. Illustratively, the programming language used may include assembly language, Ada, APL, Basic, C, C++, COBOL, dBase, Forth, Fortran, Java, Modula-2, Pascal, Prolog, Python, REXX, Visual Basic, and/or JavaScript, for example. Further, it is not necessary that a single type of instruction or single programming language be utilized in conjunction with the operation of the system and method of the foregoing. Rather, any number of different programming languages may be utilized as is necessary and/or desirable.

Also, the instructions and/or data used in the practice of the foregoing may utilize any compression or encryption technique or algorithm, as may be desired. An encryption module might be used to encrypt data. Further, files or other data may be decrypted using a suitable decryption module, for example.

As described above, the foregoing may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the foregoing may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, an EPROM, a wire, a cable, a fiber, a communications channel, a satellite transmission, a memory card, a SIM card, or other remote transmission, as well as any other medium or source of data that may be read by the processors of the foregoing.

Further, the memory or memories used in the processing machine that implements the foregoing may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the foregoing, a variety of "user interfaces" may be utilized to allow a user to interface with the processing machine or machines that are used to implement the foregoing. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, keypad, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the foregoing, it is not necessary that a human user actually interact with a user interface used by the processing machine of the foregoing. Rather, it is also contemplated that the user interface of the foregoing might interact, i.e., convey and receive information, with another processing machine, rather than a human user. Accordingly, the other processing machine might be characterized as a user. Further, it is contemplated that a user interface utilized in the system and method of the foregoing may interact partially with another processing machine or processing machines, while also interacting partially with a human user.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein.

We claim:

1. A scale, comprising:
    a housing;
    an arm hingedly coupled to the housing, whereby the arm moves between an open position and a closed position, wherein in the open position, the arm is configured to receive at least a portion of an item to be weighed such that the item is suspended from the arm, and wherein in the closed position, the arm folds into the housing;

a weighing portion defining a recessed surface of the arm, such that the at least a portion of the item is configured to rest about the recessed surface, so as to suspend the item therefrom;

a load cell sensor located within the weighing portion and at least partially covered by the recessed surface, such that the at least a portion of the item is configured to impart a force onto the load cell sensor when resting on the recessed surface; and a display located on the housing, the display configured to show a weight of the item.

2. The scale of claim 1, wherein the housing comprises a rear wall, the arm comprising a first end and a second end located opposite the first end, wherein the second end is hingedly coupled to the rear wall.

3. The scale of claim 2, wherein the weighing portion is located closer to the first end than the second end.

4. The scale of claim 3, the scale further comprising a button located on a front surface of the rear wall, the button configured to tare the weighing portion of the scale.

5. The scale of claim 4, wherein the button is configured to zero the weighing portion of the scale.

6. The scale of claim 2, further comprising a toggle switch located on a front surface of the rear wall, the toggle switch configured to select a unit of measure for the weight.

7. The scale of claim 6, wherein the unit of measure comprises one of kilograms and pounds.

8. The scale of claim 2, wherein the scale is powered by at least one battery, the scale further comprising a battery compartment located on the rear wall.

9. The scale of claim 1, wherein the housing comprises a top portion and wherein the display is located on the top portion.

10. The scale of claim 9, wherein the housing comprises a bottom portion located opposite the top portion, wherein the arm is hingedly coupled to the housing closer to the bottom portion than the top portion.

11. The scale of claim 2, further comprising a plate removably coupled to a back surface of the rear wall of the housing, wherein the plate is configured to couple, via an attaching mechanism, to a wall of a building to thereby couple the scale to the wall of the building.

12. The scale of Claim 1, wherein the display is configured to show the weight of the item in units selected from the group consisting of pounds, kilograms, grams, ounces, and combinations thereof.

13. The scale of Claim 1, wherein the weighing portion is configured to receive a secondary device configured to hold the item to be weighed.

14. The scale of claim 13, wherein the secondary device is selected from the group consisting of a bag, a basket, a tray, a hook, and combinations thereof.

15. The scale of Claim 1, further comprising a strain gauge, a converter, and a microchip.

16. The scale of claim 15, wherein the load cell sensor has an electric charge and the strain gauge is configured to convert a change in the electric charge to an analog electric signal.

17. The scale of claim 16, wherein the converter is configured to convert the analog electric signal to a digital signal.

18. The scale of claim 17, wherein the microchip receives the digital signal and communicates the digital signal to the display.

19. The scale of claim 18, wherein the display shows the digital signal as the weight.

20. The scale of claim 1, wherein the recessed surface extends substantially across an entire width of the arm.

* * * * *